(12) United States Patent
Dimitropoulos

(10) Patent No.: US 10,205,678 B2
(45) Date of Patent: Feb. 12, 2019

(54) SYSTEMS AND METHODS FOR CLIENT-SIDE DYNAMIC INFORMATION RESOURCE ACTIVATION AND DEACTIVATION

(71) Applicant: Google Inc., Mountain View, CA (US)

(72) Inventor: Dimitrios Dimitropoulos, San Diego, CA (US)

(73) Assignee: Google LLC, Mountain View, CA (US)

( * ) Notice: Subject to any disclaimer, the term of this patent is extended or adjusted under 35 U.S.C. 154(b) by 214 days.

(21) Appl. No.: 15/211,456

(22) Filed: Jul. 15, 2016

(65) Prior Publication Data

US 2017/0346758 A1 Nov. 30, 2017

(30) Foreign Application Priority Data

May 24, 2016 (EP) .................................... 16386008

(51) Int. Cl.
| | | |
|---|---|---|
| G06F 15/16 | (2006.01) | |
| H04L 12/911 | (2013.01) | |
| H04L 12/919 | (2013.01) | |
| H04L 29/08 | (2006.01) | |
| G06F 3/0481 | (2013.01) | |

(52) U.S. Cl.
CPC ............ *H04L 47/78* (2013.01); *G06F 3/0481* (2013.01); *H04L 47/765* (2013.01); *H04L 67/02* (2013.01); *G06F 2203/04803* (2013.01)

(58) Field of Classification Search
CPC ........ H04L 47/765; H04L 47/78; H04L 67/02
USPC ................................................. 709/203, 246
See application file for complete search history.

(56) References Cited

U.S. PATENT DOCUMENTS

| | | | | |
|---|---|---|---|---|
| 7,437,660 | B1* | 10/2008 | Mehta | ............... G06F 17/30893 |
| | | | | 709/203 |
| 2003/0101235 | A1* | 5/2003 | Zhang | ..................... H04L 51/04 |
| | | | | 709/218 |
| 2010/0057843 | A1* | 3/2010 | Landsman | .......... H04L 63/0407 |
| | | | | 709/203 |

(Continued)

OTHER PUBLICATIONS

AngularJS Backbone React and Single Page Applications, 2016.

(Continued)

*Primary Examiner* — Phuoc H Nguyen
(74) *Attorney, Agent, or Firm* — Foley & Lardner LLP

(57) ABSTRACT

Systems and methods for dynamically modifying properties of content elements within information resources by client-side computing devices are provided herein. A computing device may receive an information resource. The information resource may include a content element and a content modification script. The content modification script may include a predefined trigger event and a change list for modifying the information resource. The computing device may detect an occurrence of a predefined trigger event on the information resource. The computing device may determine that the information resource satisfies a condition of the change list, responsive to detecting the occurrence of the predefined trigger event. The computing device may set a property of the content element, responsive to determining that the information resource satisfies the condition. The computing device may add a modification indicator to the content element to prevent modification while the information resource satisfies the condition of the change list.

20 Claims, 10 Drawing Sheets

(56) References Cited

U.S. PATENT DOCUMENTS

| | | | | |
|---|---|---|---|---|
| 2011/0099294 A1* | 4/2011 | Kapur | .................... | H04L 67/02 709/246 |
| 2014/0280522 A1* | 9/2014 | Watte | .................... | H04L 67/02 709/203 |
| 2015/0081781 A1* | 3/2015 | Britt | .................... | H04L 67/10 709/203 |

OTHER PUBLICATIONS

Known Visual Experience Composer Limitations, 2016.
Single Page Application Implementation Adobe Target, 2016.
Target at.js Limitations, 2016.
Anonymous: "How to Add Attribute to an HTML Element in jQuery", , Sep. 12, 2013 (Sep. 12, 2013), XP055314054, Retrieved from the Internet: URL:https://web.archive.org/web/20130912100146/http://www.tutorialrepublic.com/faq/how-to-add-attribute-to-an-html-element-in-jquery. php.
Anonymous: "javascript—Increasing data attribute on click—Stack Overflow", Apr. 18, 2014 (Apr. 18, 2014), XP55313450, Retrieved from the Internet: URL:http://web.archive.org/web/20140418024412/http://stackoverflow.com/questions/23086585/increasing-data-attribute-on-click.
Anonymous: "JavaScript If . . . Else Statements", Jan. 3, 2010 (Jan. 3, 2010), XP55314109, Retrieved from the Internet: URL:https://web.archive.org/web/20100103095730/http://www.w3schools.com/JS/js_if_else.asp.
Extended Search Report for EP Application No. 16386008.3, dated Nov. 2, 2016.
Anonymous: "javascript-setting a value dynamically for data attributes using jquery-Stack Overflow", Mar. 13, 2013 (Mar. 13, 2013), XP55313583, Retrieved from the Internet: URL:https://web.archive.org/web/20130313190630/http://stackoverflow.com/questionsf7163234/setting-a-value-dynamically-for-data-attributes-using-jquery.

* cited by examiner

Default

Deactivation

SYSTEMS AND METHODS FOR CLIENT-SIDE DYNAMIC INFORMATION RESOURCE ACTIVATION AND DEACTIVATION

RELATED APPLICATION

This application claims foreign priority to European Patent Application No. 16386008.3, entitled, "Systems And Methods For Client-Side Dynamic Information Resource Activation And Deactivation," filed May 24, 2016, the entirety of which is hereby incorporated by reference in its entirety.

BACKGROUND

In a computer networked environment, such as the Internet, content elements may be rendered by an application (e.g., web browser) on information resources (e.g., webpages). Each content element (e.g., content within an inline frame element) of the information resource may be transmitted via the computer networked environment from a different server to a computing device.

SUMMARY

An information resource may be modified multiple times to measure interaction rates with the content elements thereon resulting from such modifications. Certain variations of the information resource may have higher interaction rates than other variations. To test and compare the interaction rates, client devices may be provided with different variations of the same information resource such as a control ("A") and one or more modifications ("B") to the information resource, sometimes referred to as "A/B testing". A measurement server may aggregate the recorded interactions for each variation of the information resource across the client devices, including time spent utilizing the resource, interactions with the resource or related resources, etc. Using these aggregated data, the measurement server may identify the variation of the information resource with the most optimal interaction rate (e.g., highest number of interactions, longest or shortest time spent depending on implementation, etc.). Using the variation of the information resource identified as having the most optimal interaction rate may improve human-computer interactions (HCI).

Some information resources may be asynchronously updated (e.g., single page applications), retrieved with a single load by the client device and subsequently modified with function calls (e.g., AJAX calls) and server responses (e.g., JSON data objects) without resulting in a reload. For example, some implementations of Internet applications may allow the user to variously open and close subdirectories in a list, add or remove objects from a group, or perform other such interactions. The application may modify the view rendered for the user, without requiring reload or refresh of the entire application. User interactions via the client device may dynamically alter the behavior and appearance of such information resources. This asynchronous behavior may pose technical challenges with generating variations of the information resource to test and measure interaction rates. In synchronously updated information resources, changes may be applied to the content elements of the information resource with a priori knowledge as to which behavior of the information resource may be static. In contrast, with asynchronously updated information resources, applying changes to specific content elements as specified by each modification may result in the breakdown of the logic of the information resource. This is because the behavior of the information resource may change with interactions thereupon. For example, if a change was applied to a content element after a change in behavior, there may be multiple instantiations of the content element on the information resource. In one such example, given a modification under test that adds an icon to objects added to a group, if a user repeatedly adds and removes the object from the group, additional icons may be generated for each instance of adding the object, without properly deleting them each time. Accordingly, such modifications may result in unpredictable or undesirable results.

To address these and other technical challenges, a content modification script may be transmitted to the client device with the information resource. The content modification script may specify trigger events and a change list for modifying the content elements of the information resource. The client device may detect function calls made by the information resource and data objects received from the server. Using the content modification script, the client device may determine whether such function calls or data objects match trigger events. Trigger events may be predefined, and may correspond to a subset of function calls or data objects. Upon detecting the trigger event, the client device may determine whether the information resource satisfies conditions of the change list for modifying the information resource. The conditions of the change list may include an activation mode corresponding to a single run-time state of the information resource. The client device may then apply changes to the content elements as specified by the change list of the content modification script, tagging each content element with a modification indicator. The modification indicator may prevent multiple instantiations of the same content element in subsequent changes in the information resource.

The client device may also dynamically apply changes to the content elements of the information resource as specified by the content modification script. Subsequent function calls made by the information resource and data objects received from the server may result in the addition of new content elements onto the information resource. Upon detecting the subsequent trigger event, the client device may again determine whether the information resource satisfies conditions of the change list. If the conditions of the change list are still satisfied, the client device may identify the content elements previously modified from the tagged modification indicators and the new content elements not modified. The client device may then apply the changes to the new content elements as specified by the change list of the content modification script and tag the new content element with a modification indicator. On the other hand, if the conditions of the change list are no longer satisfied, the client device may revert each content element to their original states. The reversion may be in the reverse order that the content elements were modified, as some changes may be order dependent.

In at least one aspect, the present disclosure is directed to a method of dynamically modifying properties of content elements within information resources by client-side computing devices. An application executed by a processor of a client device may receive an information resource. The information resource may include a content element and a content modification scrip. The content element may include a property having a first value. The content modification script may include a predefined trigger event and a change list for modifying the information resource. The change list may include a second value for the property. An event detector executed by the processor may detect a first occurrence of the predefined trigger event on the information resource. The event detector may determine, responsive to detecting the first occurrence of the predefined trigger event, that the information resource satisfies an activation condition of the change list. A policy enforcer executing by the processor may set, responsive to determining that the information resource satisfies the activation condition of the change list, the property of the content element to the second value. The policy enforcer may add, responsive to setting the property of the content element to the second value, a modification indicator corresponding to the content element to prevent modification of the content element while the information resource satisfies the activation condition of the change list.

In some implementations, the event detector may detect a second occurrence of the predefined trigger event on the information resource. The second occurrence may be subsequent to the first occurrence. In some implementations, the event detector may determine, responsive to detecting the second occurrence of the predefined trigger event of the information resource, that the information resource satisfies a deactivation condition of the change list. In some implementations, the policy enforcer may reset, responsive to determining that the information resource satisfies the deactivation condition, the property of the content element to the first value.

In some implementations, the event detector may determine, responsive to detecting the second occurrence of the predefined trigger event, that the information resource satisfies the activation condition of the change list. The activation condition may include loading of a second information resource by the application. The second information resource may include a second content element. The second content element may includes second property having a third value. In some implementations, the policy enforcer may set, responsive to detecting the second occurrence of the predefined trigger event and determining that the information resource satisfies the activation condition of the change list, the second property of the second content element to a fourth value of the change list different from the third value. In some implementations, the policy enforcer may add, responsive to setting the second property of the second content element to the fourth value, a second modification indicator corresponding to the second content element to prevent modification of the second content element while the information resource satisfies the activation condition of the change.

In some implementations, the application may receive, subsequent to detecting the first occurrence of the predefined trigger event, a second content element including a second property having a third value, second content element inserted into the information resource. In some implementations, the event detector may detect a second occurrence of the predefined trigger event on the information resource. The second occurrence may be subsequent to the first occurrence. In some implementations, the event detector may determine, responsive to detecting the second occurrence of the predefined trigger event, that the information resource satisfies the activation condition of the change list. In some implementations, the policy enforcer may determine, responsive to determining that the information resource satisfies the activation condition of the change list, that the second element is inserted into the information resource subsequent to detecting the first occurrence of the predefined trigger event. In some implementations, the policy enforcer may set, responsive to determining that the second element is inserted to the information resource, the second property of the second content element to a fourth value of the change list different from the third value. In some implementations, the policy enforcer may add, to a modification sequence list, a second element identifier corresponding to the second content element subsequent to adding of a first element identifier corresponding to the content element. In some implementations, the event detector may detect a third occurrence of the predefined trigger event on the information resource. The second occurrence may be subsequent to the third occurrence of the predefined trigger event. In some implementations, the event detector may determine, responsive to detecting the second occurrence of the predefined trigger event, that the information resource satisfies a deactivation condition of the change list. In some implementations, the policy enforcer may reset, responsive to determining that the information resource satisfies the deactivation condition, the property of the content element to the first value and the second property of the second content element to the third value based on the modification sequence list. In some implementations, resetting the property of the content element to the first value responsive to determining that the information resource satisfies the deactivation condition may further include resetting the property of the content element to the first value subsequent to resetting the second property of the second content element to the third value in accordance to the modification sequence list.

In some implementations, the application may generate a first style rule corresponding to the content element based on the first value of the property of the content element. In some implementations, setting the property of the content element to the second value may further include generating a second style rule corresponding to the content element based on the second value specified by the content modification script. The second style rule may override the first style rule.

In some implementations, the event detector may detect a second occurrence of the predefined trigger event on the information resource. The second occurrence may be subsequent to the first occurrence. In some implementations, the event detector may identify, responsive to detecting the second occurrence of the predefined trigger event, an occurrence of an interaction event on the content element. In some implementations, the policy enforcer may maintain, responsive to identifying the occurrence of the interaction event on the content element, the modification indicator on the content element to prevent the modification of the content element while the information resource satisfies the activation condition of the change list.

In some implementations, the event detector may detect an occurrence of an interaction event on the content element. The interaction event may change the property of the content element to a third value different from the second value. In some implementations, the policy enforcer may remove, responsive to detecting the occurrence of the interaction event on the content element, the modification indicator from the content element to allow subsequent modification of the content element.

In some implementations, the event detector may detect a second occurrence of the predefined trigger event on the information resource. The second occurrence may be subsequent to the first occurrence. In some implementations, the policy enforcer may identify, responsive to detecting a second occurrence of the predefined trigger event, that the content element is modified from the modification indicator. In some implementations, the policy enforcer may maintain, responsive to identifying that the content element is modified, the second value of the property of the content element.

In some implementations, the application may receive, subsequent to receiving the information resource, a second content element for insertion into the information resource. The second content element may include a second property having a third value. In some implementations, the event detector may detect a second occurrence of the predefined trigger event on the information resource. The second occurrence may be subsequent to the first occurrence. The predefined trigger event may include receipt of additional content for the information resource. In some implementations, the policy enforcer may determine, responsive to detecting the second occurrence of the predefined trigger event, that the second content element is unmodified. In some implementations, the policy enforcer may set, responsive to determining that the second content element is unmodified, the second property of the second content element to a fourth value of the change list different from the third value.

In another aspect, the present disclosure is directed to a system for dynamically modifying properties of content elements within information resources by client-side computing devices. An application executed by a processor of a client device may be configured to receive an information resource. The information resource may include a content element and a content modification script. The content element may include a property having a first value. The content modification script may include a predefined trigger event and a change list for modifying the information resource. The change list may include a second value for the property. An event detector executed by the processor may be configured to detect a first occurrence of the predefined trigger event on the information resource. The event detector may be configured to determine, responsive to detecting the first occurrence of the predefined trigger event, that the information resource satisfies an activation condition of the change list. A policy enforcer executed by the processor may be configured to set, responsive to determining that the information resource satisfies the activation condition of the change list, the property of the content element to the second value. The policy enforcer may be configured to add, responsive to setting the property of the content element to the second value, a modification indicator corresponding to the content element to prevent modification of the content element while the information resource satisfies the activation condition of the change list.

In some implementations, the event detector may be further configured to detect a second occurrence of the predefined trigger event on the information resource. The second occurrence may be subsequent to the first occurrence. In some implementations, the event detector may be further configured to determine, responsive to detecting the second occurrence of the predefined trigger event of the information resource, that the information resource satisfies a deactivation condition of the change list. In some implementations, the policy enforcer may be further configured to reset, responsive to determining that the information resource satisfies the deactivation condition, the property of the content element to the first value.

In some implementations, the event detector may be further configured to determine, responsive to detecting the second occurrence of the predefined trigger event, that the information resource satisfies the activation condition of the change list. The activation condition may include loading of a second information resource by the application. The second information resource may include a second content element. The second content element may include a second property having a third value. In some implementations, the policy enforcer may be further configured to set, responsive to detecting the second occurrence of the predefined trigger event and determining that the information resource satisfies the activation condition of the change list, the second property of the second content element to a fourth value of the change list different from the third value. In some implementations, the policy enforcer may be further configured to add, responsive to setting the second property of the second content element to the fourth value, a second modification indicator corresponding to the second content element to prevent modification of the second content element while the information resource satisfies the activation condition of the change list.

In some implementations, the application may be further configured to receive, subsequent to detecting the first occurrence of the predefined trigger event, a second content element including a second property having a third value. The second content element may be inserted into the information resource. In some implementations, the event detector may be further configured to detect a second occurrence of the predefined trigger event on the information resource. The second occurrence may be subsequent to the first occurrence. In some implementations, the event detector may be further configured to determine, responsive to detecting the second occurrence of the predefined trigger event, that the information resource satisfies the activation condition of the change list. In some implementations, the policy enforcer may be further configured to determine, responsive to determining that the information resource satisfies the activation condition of the change list, that the second element is inserted into the information resource subsequent to detecting the first occurrence of the predefined trigger event. In some implementations, the policy enforcer may be further configured to set, responsive to determining that the second element is inserted to the information resource, the second property of the second content element to a fourth value of the change list different from the third value. In some implementations, the policy enforcer may be further configured to add, to a modification sequence list, a second element identifier corresponding to the second content element subsequent to adding of a first element identifier corresponding to the content element. In some implementations, the event detector may be further configured to detect a third occurrence of the predefined trigger event on the information resource, the second occurrence subsequent to the third occurrence of the predefined trigger event. In some implementations, the event detector may be further configured to determine responsive to detecting the second occurrence of the predefined trigger event, that the information resource satisfies a deactivation condition of the change list. In some implementations, the policy enforcer may be further configured to reset, responsive to determining that the information resource satisfies the deactivation condition, the property of the content element to the first value and the second property of the second content element to the third value based on the modification sequence list. In some implementations, the policy enforcer may be further configured to reset the property of the content element to the first value subsequent to resetting the second property of the second content element to the third value in accordance to the modification sequence list.

In some implementations, the application may be further configured to generate a first style rule corresponding to the content element based on the first value of the property of the content element. In some implementations, the policy enforcer may be further configured to generate a second style rule corresponding to the content element based on the second value specified by the content modification script. The second style rule may override the first style rule.

In some implementations, the event detector may be further configured to detect a second occurrence of the predefined trigger event on the information resource. The second occurrence may be subsequent to the first occurrence. In some implementations, the event detector may be further configured to identify, responsive to detecting the second occurrence of the predefined trigger event, an occurrence of an interaction event on the content element. In some implementations, the policy enforcer may be further configured to maintain, responsive to identifying the occurrence of the interaction event on the content element, the modification indicator on the content element to prevent the modification of the content element while the information resource satisfies the activation condition of the change list.

In some implementations, the event detector may be further configured to detect an occurrence of an interaction event on the content element. The interaction event may change the property of the content element to a third value different from the second value. In some implementations, the policy enforcer may be further configured to remove, responsive to detecting the occurrence of the interaction event on the content element, the modification indicator from the content element to allow subsequent modification of the content element.

In some implementations, the event detector may be further configured to detect a second occurrence of the predefined trigger event on the information resource. The second occurrence may be subsequent to the first occurrence. In some implementations, the policy enforcer may be further configured to identify, responsive to detecting the second occurrence of the predefined trigger event, that the content element is modified from the modification indicator. In some implementations, the policy enforcer may be further configured to maintain, responsive to identifying that the content element is modified, the second value of the property of the content element.

In some implementations, the application may be further configured to receive subsequent to receiving the information resource, a second content element for insertion into the information resource. The second content element may include a second property having a third value. In some implementations, the event detector may be further configured to detect a second occurrence of the predefined trigger event on the information resource. The second occurrence may be subsequent to the first occurrence. The predefined trigger event may include receipt of additional content for the information resource. In some implementations, the policy enforcer may be further configured to determine, responsive to detecting the second occurrence of the predefined trigger event, that the second content element is unmodified. In some implementations, the policy enforcer may be further configured to set, responsive to determining that the second content element is unmodified, the second property of the second content element to a fourth value of the change list different from the third value.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of dynamically restricting rendering of unauthorized content included in information resources in a computer network environment. The various concepts introduced above and discussed in greater detail below may be implemented in any of numerous ways, as the described concepts are not limited to any particular manner of implementation.

An information resource may be modified multiple times to measure interaction rates with the content elements thereon resulting from such modifications. Certain variations of the information resource may have higher interaction rates than other variations. To test and compare the interaction rates, client devices may be provided with different variations of the same information resource such as a control ("A") and one or more modifications ("B") to the information resource. A measurement server may aggregate the recorded interactions for each variation of the information resource across the client devices. Using these aggregated data, the measurement server may identify the variation of the information resource with the most optimal interaction rate (e.g., highest, lowest, longest, shortest, etc., depending on implementation). Using the variation of the information resource identified as having the most optimal interaction rate may improve human-computer interactions (HCI).

Some information resources may be asynchronously updated (e.g., single page application), retrieved with a single load by the client device and subsequently modified with function calls (e.g., asynchronous JavaScript and XML (AJAX) requests) and server responses (e.g., JavaScript Notation (JSON) data objects) without resulting in a reload. User interactions via the client device may dynamically alter the behavior and appearance of such information resources. This asynchronous behavior may pose technical challenges with generating variations of the information resource to test and measure interaction rates. In synchronously updated information resources, changes may be applied to the content elements of the information resource a priori as which the behavior of the information resource may be static. In contrast, with asynchronously updated information resources, applying changes to specific content elements as specified by each modification a priori may result in the breakdown of the logic of the information resource. This is because the behavior of the information resource may change with interactions thereupon. For example, if a change was applied to a content element after a change in behavior, there may be multiple instantiations of the content element on the information resource.

Figure 1:
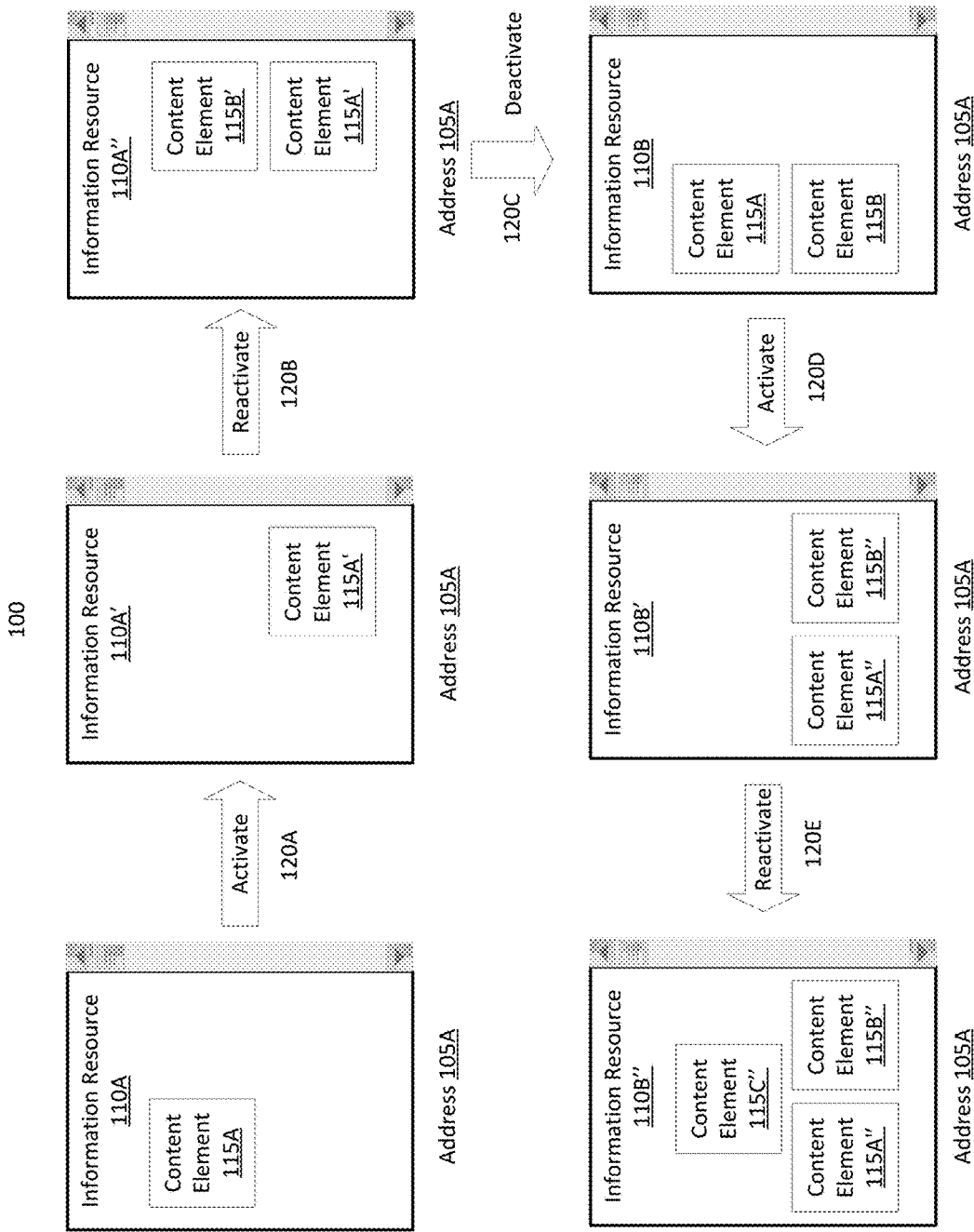
FIG. 1 is a block diagram depicting one implementation of information resources modified in accordance with the dynamic content modification script, according to an illustrative implementation.

To address these and other technical challenges, a content modification script may be transmitted to the client device with the information resource. Referring to FIG. 1, depicted is an example sequence 100 of an information resource 110 modified in accordance with the dynamic content modification script. In this example, the client device may initially have loaded default information resource 110A along with the content modification script. The content modification script may specify trigger events and a change list for modifying the content elements of the information resource. The default information source 110A may be asynchronously updated and may correspond to one address 105A (e.g., uniform resource locator) and may initially have a content element 115A positioned in a first location, such as generally on the upper left as shown. The client device may detect a function call made by the information resource or a data object received from a server (e.g., content provider computing device or a content publisher computing device). The client device may determine whether the function call or the received data object corresponds to one of the trigger events specified by the content modification script. If so, the client device may determine whether the information resource satisfies conditions of the change list for modifying the information resource. Satisfying the conditions of the change list may correspond to an activation or reactivation mode associated with a single state of the information resource. At 120A, the client device may then apply a change to the content element 115A as specified by the change list of the content modification script resulting in modified information resource 110A'. The modified information resource 110A' may have the modified content element 115A' positioned in a second location, such as generally on the bottom right as shown. Other modifications may be applied in other implementations, such as duplicating the content element, adding an icon, changing a color of the element, enlarging or shrinking the element, changing a transparency of the element, or any other such functions. A modification indicator may be applied to the resource or element to prevent multiple instantiations of the same content element 115A' when changes of change list are applied on the information resource 110 again.

The client device may also dynamically apply changes to the content elements of the information resource as specified by the content modification script. At 120B, sometime during or after this process, the information resource may cause a function call or receipt of a data object resulting in the injection of a new content element 115B. The client device may again determine whether the function call or the received data object corresponds to one of the trigger events specified by the content modification script. If so, the client device may determine whether the information resource still satisfies conditions of the change list for modifying the information resource. The client device may identify the content element 115A' as already modified from the tagged modification indicator and the new content element 115B as not modified from the lack of such a modification indicator. The new content element 115B may be originally placed on the bottom left of the information resource 110A. The client device may then apply another change to the content element 115B as specified by the change list of the content modification script, resulting in modified information resource 110A" as shown, positioning the modified content element 115B' to the upper right. As the previously modified content element 115A' is prevented from repeated modifications, the information resource 110A" may include a single instantiation of the content element 115A'.

Continuing onto 120C, the client device may detect another trigger event, such as another function call or receipt of another data object. The trigger event this time may be a change of the address or constituent content elements of the second information resource 110B. The initial information resource 110A and the second information resource 110B may be a part of a single web page (e.g., two states of a single page application). Upon detecting the trigger event, the client device may again determine whether the information resource 110B satisfies conditions of the change list for modifying the information resource. The client device may determine that the information resource 110B does not satisfy the conditions of the change list. For example, the address of the information resource 110B may differ from the address of the information resource 110A. In addition, the information resource 110B may have exhibited a major different from the information resource 110A. In both cases, not satisfying the conditions of the change list may correspond to a deactivation mode associated with a new state of the information source 110B. Upon determining that the conditions of the change list are no longer satisfied, the client device may revert the positions of the content elements 115A and 115B to their initial positions as shown.

Moving onto 120D, the client device may detect yet another trigger event, such as another function call or receipt of another data object. The client device may determine whether the function call or the received data object corresponds to one of the trigger events specified by the content modification script. If so, the client device may determine whether the information resource 110B satisfies conditions of the change list for modifying the information resource. The client device may then apply a change to the content elements 115A and 115B as specified by the change list of the content modification script resulting in modified information resource 110B'. The modified information resource 110B' may have the first content element 115A" positioned generally on the bottom left and the second content element 115B" positioned generally along the bottom right. The modification indicator may be tagged to both content elements 115A" and 115B" to prevent subsequent modifications while the information resource 110B' satisfies the conditions of the change list.

At 120E, sometime during or after this process, the information resource may cause a function call or receipt of a data object resulting in the injection of another new content element 115C on the information resource 110B. The client device may again determine whether the function call or the received data object corresponds to one of the trigger events specified by the content modification script. If so, the client device may determine whether the information resource still satisfies conditions of the change list for modifying the information resource. The client device may identify the content elements 115A" and 115B" as already modified from the tagged modification indicator and the new content element 115C as not modified from the lack of such a modification indicator. The new content element 115C" may be originally placed on the top right of the information resource 110B'. The client device may then apply another change to the content element 115C as specified by the change list of the content modification script, resulting in modified information resource 110B" and positioning of the modified content element 115C" to the top center. As the previously modified content elements 115A" and 115B" are prevented from repeated modifications, the information resource 110B" may include single instantiations of the content elements 115A" and 115B".

Figure 2:
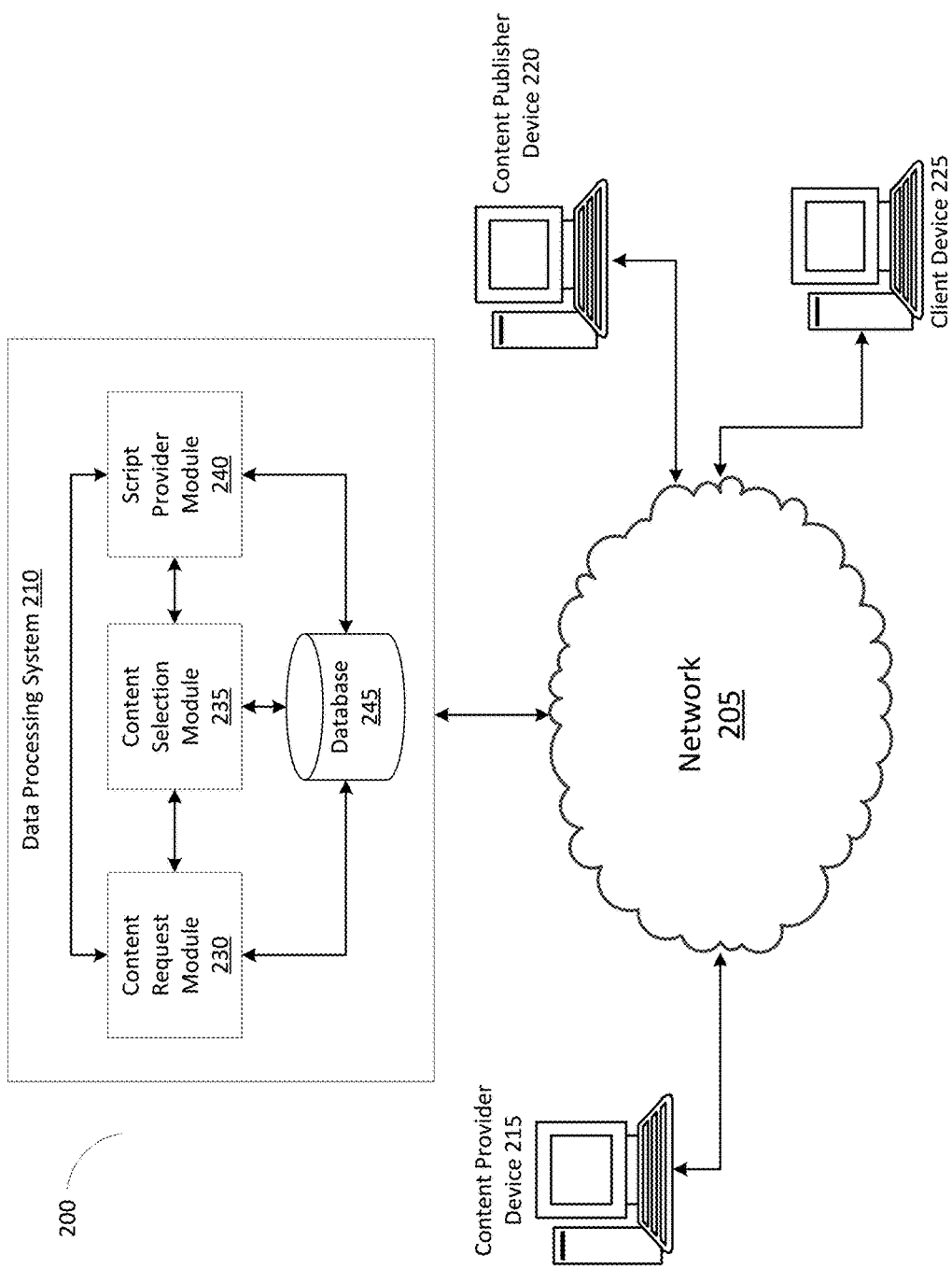
FIG. 2 is a block diagram depicting one implementation of an environment for dynamically modifying properties of content elements within information resources in a computer network environment, according to an illustrative implementation.

FIG. 2 is a block diagram depicting one implementation of an environment for dynamically modifying properties of content elements within information resources by client-side computing devices in a computer network environment. The environment 200 includes at least one data processing system 210. The data processing system 210 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 205.

The network 205 can include computer networks such as the internet, local, wide, metro or other area networks, intranets, satellite networks, other computer networks such as voice or data mobile phone communication networks, and combinations thereof. The data processing system 210 of the system 200 can communicate via the network 205, for instance with at least one content provider computing device 215, at least one content publisher computing device 220, or at least one client device 225. The network 205 may be any form of computer network that relays information between the client device 225, data processing system 210, and one or more content sources, for example, web servers, advertising servers, amongst others. For example, the network 205 may include the Internet and/or other types of data networks, such as a local area network (LAN), a wide area network (WAN), a cellular network, satellite network, or other types of data networks. The network 205 may also include any number of computing devices (e.g., computer, servers, routers, network switches, etc.) that are configured to receive and/or transmit data within network 205. The network 205 may further include any number of hardwired and/or wireless connections. For example, the client device 225 may communicate wirelessly (e.g., via WiFi, cellular, radio, etc.) with a transceiver that is hardwired (e.g., via a fiber optic cable, a CAT5 cable, etc.) to other computing devices in network 205. The client device 225 may also communicate wireless with the computing devices of the network 205 via a proxy device 150 (e.g., router, network switch, or gateway).

The content provider computing devices 215 can include servers or other computing devices operated by a content provider entity to provide content elements to the content publisher computing devices 220 or the data processing system 210. The content provided by the content provider computing device 215 can include third party content elements for display on information resources, such as a website or web page that includes primary content, e.g. content provided by the content publisher computing device 220. The content elements can also be displayed on a search results web page. The content elements associated with the content provider computing device 215 can be displayed on information resources other than web pages, such as content displayed as part of the execution of an application on a smartphone or other client device 225. The content publisher computing devices 220 or the data processing system 210 in turn can select the content elements of the content provider computing devices 215. For example, the data processing system 210 can run an ad auction to select the content elements based on various performance metrics of the respective content elements. The content publisher computing devices 220 or the data processing system can transmit the selected content elements of the content provider computing devices for display on information resources at the client devices 225.

The content publisher computing devices 220 can include servers or other computing devices operated by a content publishing entity to provide primary content for display via the network 205. For instance, the content publisher computing device 220 can include a web page operator who provides primary content for display on the web page. The content publisher computing devices 220 can also provide third party content received from the content provider computing devices 215 for display via the network 205. The primary content can include content other than that provided by the content publisher computing device 220, and the web page can include content slots configured for the display of content elements received by the content publisher computing devices 220 from the content provider computing devices 215. For instance, the content publisher computing device 220 can operate the website of a company and can provide content about that company for display on web pages of the website. The web pages can include content slots configured for the display of content elements such as images, text, videos, or any combination thereof received from the content provider computing device 215. In some implementations, the content publisher computing device 220 includes a search engine computing device (e.g. server) of a search engine operator that operates a search engine website. The primary content of search engine web pages (e.g., a results or landing web page) can include results of a search as well as third party content elements displayed in content slots such as content elements from the content provider computing device 215. In some implementations, the content publisher computing device 220 can include a server for serving video content.

In some implementations, the content publisher computing devices 220 can select one or more content elements received from the content publisher computing devices 220 to include in an information resource with the primary content for display via the network 205. The content publisher computing devices 220 can transmit to client devices 225 content elements received from the content publisher computing devices 215 along with the primary content, responsive to a request for content from the client devices 225. In some implementations, subsequent to transmitting the primary content, the content publisher computing devices 220 can transmit to the client devices 225 content elements received from the content publisher computing devices 215, responsive to a request for additional content from the client devices 225. For example, the content publisher computing device 220 can receive an initial request for primary content from a client device 225 and in response transmit an information resource including primary content to the client device. Subsequent to the client device 225 detecting a dynamic event (e.g., change in scroll length of a webpage), the content publisher computing device 220 can receive a request for additional content and in turn provide content elements cached at the content publisher computing device 220 and received from the content provider computing devices 215.

The client devices 225 can include computing devices configured to communicate via the network 205 or via the network 205 through the proxy device 150 to display data such as the content provided by the content publisher computing device 220 (e.g., primary web page content or other information resources) and the content provided by the content provider computing device 215 (e.g., content elements configured for display in an information resource). The client device 225, the content provider computing device 215, and the content publisher computing device 220 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 205. The client device 225 can be communication devices through which an end user can submit requests to receive content. The requests can be requests to a search engine and the requests can include search queries. In some implementations, the requests can include a request to access a web page.

The content provider computing devices 215, the content publisher computing device 220 and the client device 225 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 215, the content publisher computing devices 220, and the client device 225 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 215, the content publisher computing device 220 and the client device 225 (e.g., a built-in display, microphone, etc.) or external to the housing of content provider computing devices 215, the content publisher computing device 220 and the client device 225 (e.g., a monitor connected to the client device 215, a speaker connected to the client device 215, etc.), according to various implementations. For example, the content provider computing devices 215, the content publisher computing device 220 and the client device 225 may include an electronic display, which visually displays web pages using webpage data received from one or more content sources and/or from the data processing system 210 via the network 205.

The data processing system 210 can include at least one server. For instance, the data processing system 210 can include a plurality of servers located in at least one data center or server farm. In some implementations, the data processing system 210 includes a content placement system, e.g., an ad server or ad placement system. The data processing system 210 can include at least one content request module 230, at least one content selection module 235, at least one script provider module 240, and at least one database 245. The content request module 230, the content selection module 235, and the script provider module 240 each can include at least one processing unit, server, virtual server, circuit, engine, agent, appliance, or other logic device such as programmable logic arrays configured to communicate with the database 245 and with other computing devices (e.g., the content provider computing device 215, the content publisher computing device 220, or the client device 225) via the network 205.

The content request module 230, the content selection module 235, and the script provider module 240 can include or execute at least one computer program or at least one script. The content request module 230, the content selection module 235, and the script provider module 240 can be separate components, a single component, or part of the data processing system 210. The content request module 230, the content selection module 235, and the script provider module 240 can include combinations of software and hardware, such as one or more processors configured to execute one or more scripts. Accordingly, in some implementations, content request module 230, content selection module 235, and/or script provider module 240 may comprise applications, services, servers, daemons, routines, or other executable logic for performing the functions described herein.

The data processing system 210 can also include one or more content repositories or databases 245. The databases 245 can be local to the data processing system 210. In some implementations, the databases 245 can be remote to the data processing system 210 but can communicate with the data processing system 210 via the network 205. The databases 245 can include web pages, content elements (e.g., advertisements), and content modification script, among others, to serve to a client device 225. In some implementations, information resources and content elements of the information resources can include those illustratively depicted in FIGS. 4A-4E. Additional details of the contents of the database 245 will be provided below.

The content request module 230 can receive a request for content from the client device 225. The request for content can include a request for an information resource or a request for content element for the information resource. The request for content can include a device identifier corresponding to the client device 225. The request for content can include an application profile identifying an application executing on the client device 225. The request for content can include an identifier for the information resource or the content element. For example, the request for content can include Uniform Resource Locator (URL) referring to a specific resource such as a webpage (e.g., "https://www.example.com/homepage.html"). The host name of the URL for the information resource may differ from the host name of the URL for the content element. For example, the URL for the information resource can be "https://www.examplepublisher.com/index.html" but the URL for the content element can be "https://www.example_thirdparty.com/content_item_271828.html." The URL for a request for a content element can include a host page same as the URL for the information resource. For example, the URL for the information resource can be "https://www.example.com/index.html" but the URL for the content element can be "https://www.example.com/content_item_978.html."

In some implementations, the request for content can include an indicator indicating a request for a content modification script. For example, the request for the information resource can include a header including an indicator specifying the script provider module 235 or the content publisher computing device 220 to send the content modification script along with the information resource to the client device 225. In some implementations, the information resource can include the content modification script inserted in the script or markup for the information resource. In some implementations, the information resource can include a script for retrieving the content modification script for later insertion into the information resource.

The content selection module 235 or the content publisher computing device 220 can determine the content to transmit to the client device 225. The content selection module 235 or the content publisher computing device 220 can identify the address or identifier for the information resource and the content element included in the request for content. The content selection module 235 can access the database 245 and select the information resource or the content element identified by the address or identifier. The content selection module 235 can transmit a request to the content provider 215 or the content publisher 220 to access, retrieve, or otherwise receive the information resource or content element identified by the address or identifier.

In some implementations, the content selection module 235 can transmit the content to the client device 225 on behalf of one or more content publisher computing devices 220. The content selection module 235 can transmit or forward the information resource or content element identified by the address or identifier to the client device 225. For example, the data processing system 210 can receive from a client device 225 a request for an information resource or the content element. The request may include an address referring to one of the content publishers 220. In this example, the content selection module 235 can forward the request for the information resource to the respective content publisher 220. Upon receiving the information resource from the respective content publisher 220, the content selection module 235 can forward the content document to the client device 225 that made the original request, along with the content modification script. In some implementations, the content selection module 235 can generate the content for transmission to the content device 225. In some implementations, the content selection 235 can generate the information resource and one or more content elements to include in the information resource based on the request received from the client device 225. In some implementations, the content selection 235 can generate the content modification script to include in the information resource. The content modification script can be configured to cause the client device 225 to request one or more additional content elements for insertion into the information resource and transmit a pingback to the data processing system 200 indicating success of display of the respective content element at the client device 225.

In some implementations, a content publisher may configure their domains or website addresses such that requests to access information resources of the content publisher are redirected to a server of the data processing system 210. The content selection module 235 of the data processing system 210 can receive the request to access an information resource of the content publisher. In some implementations, the request can include a device identifier or other information that the content selection module 235 can use to select content that is relevant to a user of the client device from which the request was received. The content selection module 235 may access one or more servers of the content publisher that maintain content elements or servers of the data processing system 210 that maintain content elements on behalf of the content publisher. The content selection module 235 may then generate an information resource or modify an existing information resource to include content elements for display at the client device. Some of these content elements can be primary content items corresponding to the content publisher. However, in some implementations, the content elements can be advertisements that may be received from an ad server. The advertisements or other third-party content items can include an image and a source address to which to redirect client devices to responsive to receiving an interaction on the image. In some implementations, the source address can be an address of a server of a content provider. In some implementations, the image of the content item can include a link to the data processing system 210 or a server that provides the information resource to the client device. In some implementations, the link can be an encoded link that causes the client device to be redirected from the server that provides the information resource to the client device to a server of the content publisher that provided the content item to the content selection module for insertion into the information resource.

In some implementations, the content selection module 235 can receive the content element from an ad auction system that can select the content element for display based on an ad auction. The ad auction system can select an ad from a plurality of ads based on ad auction parameters, such as bid values, size of ad, click-through rate (CTR), cost per mille (CPM), and impression rate, among others. The ad auction system can select the ad from the plurality of ads further based on size specifications of the respective ad and ad performance from previous presentation of the respective ad.

The script provider module 240 can receive a request for the content modification script from the content publisher computing device 220 or the content provider computing device 215 for insertion into an information resource or content element to be provided to the client device 225. The script provider module 240 can, responsive to receiving the request for the content modification script from the content publisher computing device 220 or the content provider computing device 215, transmit the content modification script to the content publisher computing device 220 or the content provider computing device 215 for inclusion, insertion, embedding, or appending the content modification script into the information resource or the content element. In some implementations, the script provider module 240 can transmit the information resource or the content element including the content modification script to the client device 225, responsive to the request for the content modification script from the content publisher computing device 220 or the content provider computing device 215. In some implementations, the script provider module 240 can receive a request for the content modification script from the client device 225 along with a request for content. The script provider module 240 can transmit the content modification script to the client device 225. In some implementations, the script provider module 240 can include, insert, embed, or otherwise append the content modification script into the information resource or the content element to be transmitted to the client device 225. In some implementations, the script provider module 240, in conjunction with the other modules of the data processing system 210, can transmit the information resource or the content element with the content modification script embedded to the client device 225.

In some implementations, the script provider module 240 can receive a request for an up-to-date version of the content modification script from the content publisher computing device 220, the content provider computing device 215, or the client device 225. For example, the script provider module 240 can periodically receive a request for the content modification script from the content publisher computing device 220 the content provider computing device 215, or the client device 225, and in response transmit the most up-to-date version of the content modification script. In turn, the content publisher computing device 220, the content provider computing device 215, or the client device 225 can insert or otherwise embed the updated content modification script into one or more information resources. In this example, when the content publisher computing device 220 or the content provider computing device 215 receives a request for an information resource from the client device 225, the content publisher computing device 220 or the content provider computing device 215 transmit the respective information resource or content element along with the content modification script to the client device 225.

In some implementations, the script provider module 240 can receive a request for a change list for the content modification script to apply to the content elements of the information resource from the content publisher computing device 220, the content provider computing device 215, or the client device 225. In some implementations, the request for the change list can be received subsequent to transmitting the information resource. In some implementations, the script provider module 240 can receive a request for values for modifying properties of the content elements of the information resource from the content publisher computing device 220, the content provider computing device 215, or the client device 225. In some implementations, the request for the values of modifying the properties of the content element can be received subsequent to transmitting the information resource. In some implementations, the script provider module 240 can transmit the change list or the values for modifying the properties of the content elements of the information resource. Details of when the request for the change list is transmitted to the script provider module 240 are below.

Figure 3:
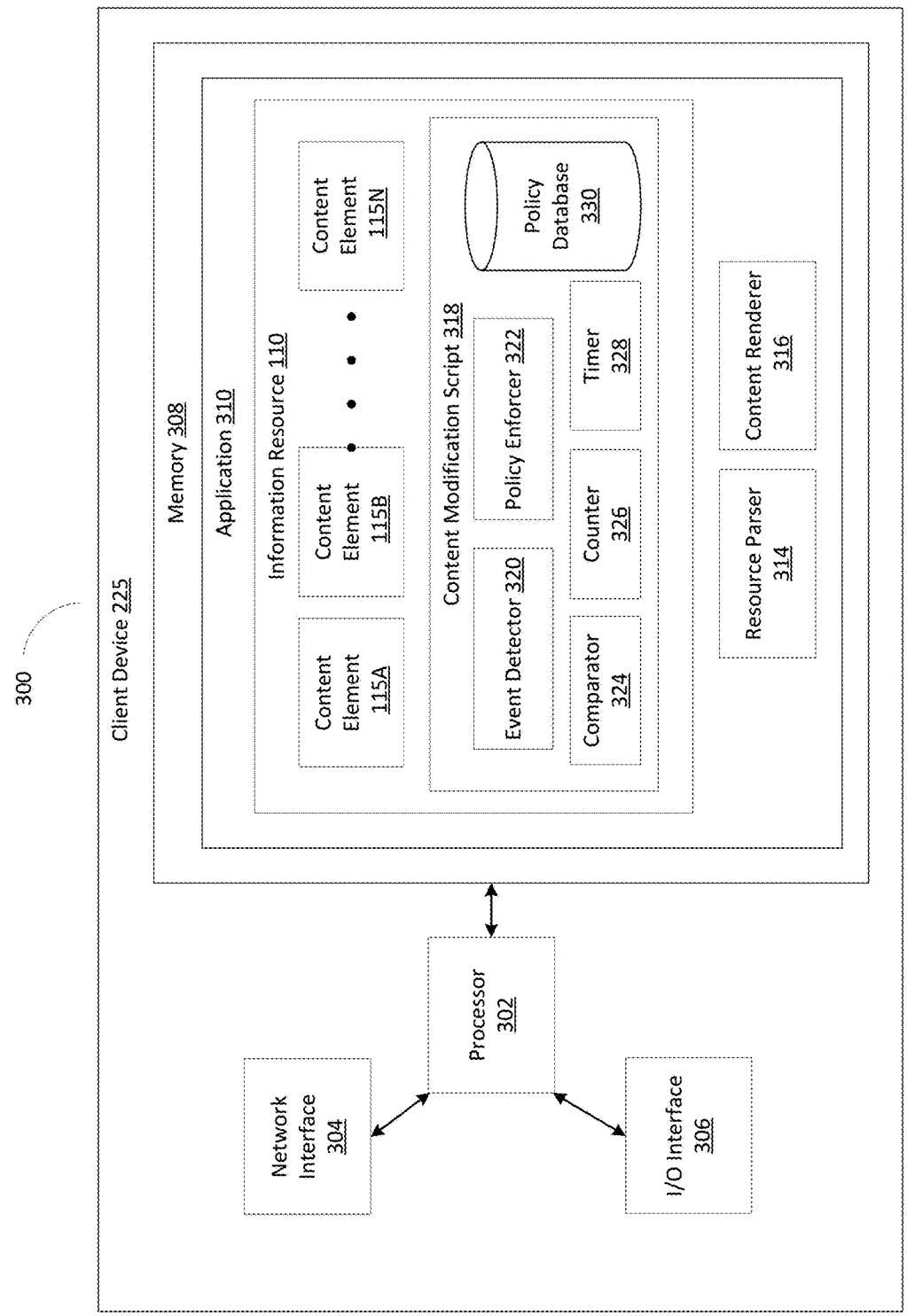
FIG. 3 is a block diagram depicting one implementation of a computing device including a dynamic content modification script, according to an illustrative implementation.

Referring now to FIG. 3, illustrated is a block diagram depicting one implementation of a computing device (e.g., client device 225) in a content modification system 300, according to an illustrative implementation. In brief overview, the content modification system 300 can include a client device 225. The client device 225 can include a processor 302, a network interface 304, an input/output (I/O) interface 306, and memory 308. The processor 302, the network interface 304, the input/output interface 306, and the memory 308 may be of those detailed below in conjunction with FIG. 6 (e.g., processor 620, communication interface 605, input device 615 and output device 610, and memory 625 of computer system 600 respectively). The memory 308 may include an application 310 (e.g., web browser). The application 310 can include, for example, an Internet browser, mobile application, or any other computer program capable of executing or otherwise invoking computer-executable instructions processed by the processor 302 the client device 225, such as the computer-executable instructions included in the information resource 110, one or more content elements 115A-115N, the content modification script 318, resource parser 314, or the content renderer 316. The functionalities of the application 310, the content modification script 318, and any components, modules, or sub-components or sub-modules thereof may be repeated multiple times.

The information resource 110 and the one or more content elements 115A-115N of the information resource 110 can be received by the application 310 of the client device 225 via the network 205 from the data processing system 210, the content publisher computing device 215, or the content provider computing device 220. In some implementations, the information resource 110 and the one or more content elements 115A-115N can be from the same source (e.g., the data processing system 210). In some implementation, the same source may be identified by a similar identifier. For example, the information resource 110 may correspond to the URL "www.example.com/index.html" whereas one of the content elements 115A-115N corresponds to "www.example.com/q31.html." In this example, the host names in the URL for the information resource 110 and the content element 215A-N is the same. In some implementations, the information resource 110 and the one or more content elements 115A-115N can be from the different sources identified by different identifiers.

The information resource 110 can include script, markup, or otherwise code processed by the application 310 and executed by the one or more processors of the client device 225. For example, the information resource 110 can include HyperText Markup Language (HTML), Extensible HyperText Markup Language (XHTML), Extensible Markup Language (XML), Cascading Style Sheets (CSS), and JavaScript, or any combination thereof. The information resource 110 can include one or more content elements 115A-115N and the content modification script 318.

Each of the one or more content elements 115A-115N can correspond to a segment of the code of the information resource 110. In some implementations, each of the content elements 115A-115N can include an HTML element. An HTML element can include, for example, a heading, body, paragraph, division, section, inline frame, image, canvas, applet, script, audio, video, table, and list, among others. Each of the content elements 115A-115N can correspond to each of the one or more style rules. The content element 115A-115N may include one or more properties corresponding to the one or more style rules. Each of the one or more properties for each content elements 115A-115N may include one or more values. Examples of properties for content elements 115A-115N may include color, font, font size, font type, size, and position, among others. Each of the one more style rules (e.g., CSS style rules) can specify one or more visual properties of the corresponding content element 115A-115N. The one or more visual properties may include color, alignment, size, font, position on the rendered information resource 110, among others.

The resource parser 314 can process each of the one or more content elements 115A-115N of the information resource 110 to generate an object model. For example, the resource parser 314 can parse the HTML markup and the CSS style rules of the information resource 110 to generate a Document Object Model (DOM) tree. The document tree can include one or more content objects associated with each other in a hierarchical manner. For example, two content objects in the DOM tree can have a parent-child relationship in a tree data structure. Each of the content objects can correspond to one format for one of the one or more content elements 115A-115N. Each of the content objects in the document tree can include one or more properties. Each of the content objects in the document tree may correspond to one or more style rules included in the information resource 110.

Using the object model generated by the resource parser 314, the content renderer 316 may then render or display the information resource 110 on an output display device 306 of the client device 225. The content renderer 316 may generate a render tree using the object model. The render tree may specify the application 310 of the client device 225 a sequence or order in which to paint or render each of the content elements 115A-115N on the output display device 306 of the client device 225. The rendering tree can include one or more nodes associated with each other in a hierarchical manner. For example, two nodes can have a parent-child relationship in a tree data structure. Each of the nodes in the rendering tree can correspond to a content element 215A-N of the information resource 110 that is to be rendered. Each of the nodes in the render can be matched to one or more rendering properties. The content renderer 316 may then generate a layout from the render tree. The layout may specify size and position of each of the content elements 115A-115N on the output display device 306 of the client device 225. Using the render tree or the layout generated by the content renderer 316, the processor 302 may render and display the information resource 110 on the output display device 306 of the client device 225.

Figure 4A:
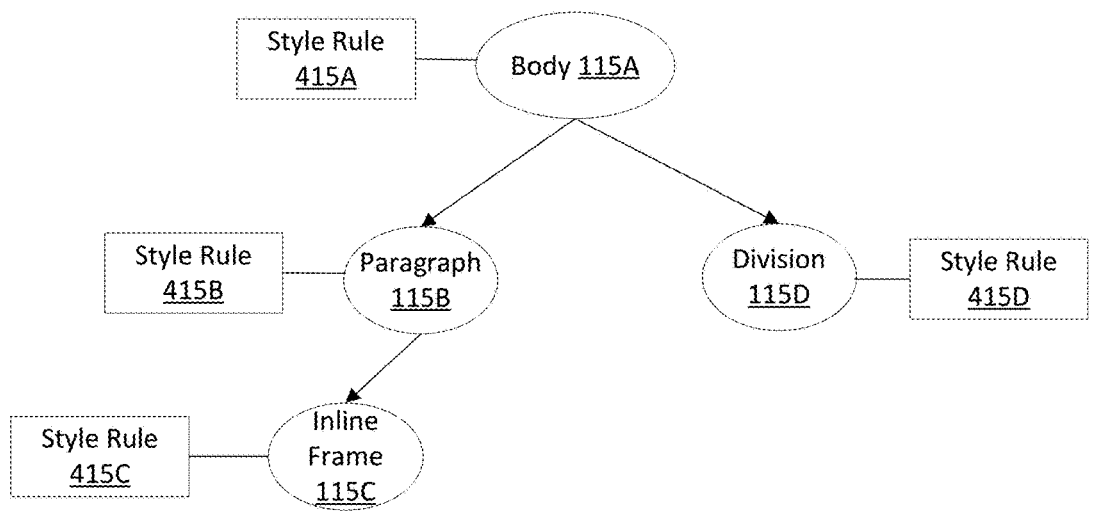
FIG. 4A is a block diagram depicting an object model and a rendering of an information resource with content elements as initially loaded by the computing device, according to an illustrative implementation.
Figure 4A:
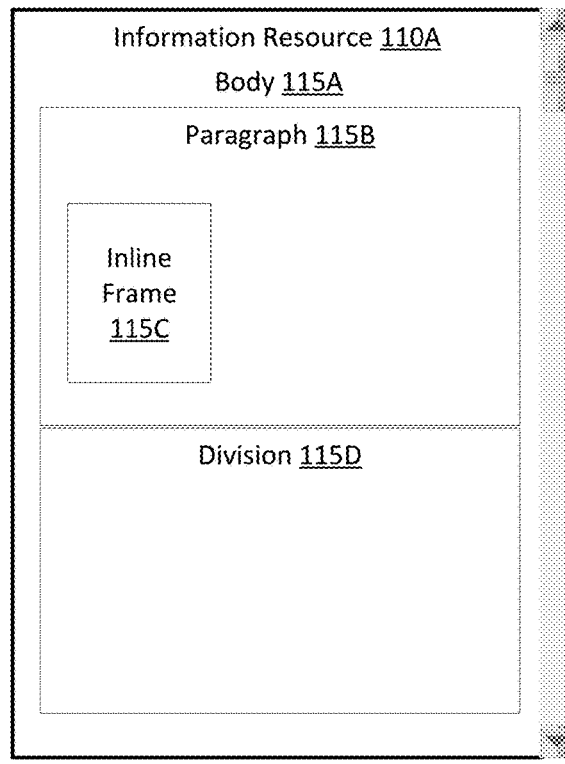

Referring briefly to FIG. 4A, illustrated is a block diagram depicting an object model 400A and a rendering 405A of an information resource 110A with content elements 115A-D as initially loaded by the client device 225, according to an illustrative implementation. The address 105A may correspond to a URL address of the information resource 110. The object model 400A may be generated by the resource parser 314. Each of the content elements 115A-D in the object model 400A may correspond to a tag in the HTML markup of the information resource 110A. Each style rule 415A-415D in the object model 400A may correspond to a CSS style rule language of the information resource 110A. In the example depicted in FIG. 4A, the object model 400A may include a body element 115A (e.g., "<body>" tag) with a corresponding style rule 415A, a paragraph element 115B (e.g., "<p>" tag) with a corresponding style rule 415B, an inline frame element 115C (e.g., "<frame>" tag) with a corresponding style rule 415C, and a division element 115D (e.g., "<div>" tag) with a corresponding style rule 415D. The rendering 405A of the information resource 110A may be generated by the content renderer 316. The rendering 405A of the information resource 110A may include the body element 115A defining the entire body of the information resource 110A, the paragraph element 115B generally positioned at the top half of the body of the information resource 110A, the inline frame element 115C generally positioned on the left side of the paragraph element 115B, and the division element 115D generally at the bottom half of the body of the information resource 110A.

The information resource 110 may be an asynchronous web application (e.g., single web application). In some implementations, the information resource 110 or the one or more content elements 115A-115N may be dynamically and continuously modified, altered, or otherwise updated via function calls to and receipt of data objects from the data processing system 210, the content provider device 215, or the content publisher device 220. In some implementations, the information resource 110 or the one or more content elements 115A-115N may be dynamically and continuously modified, altered, or otherwise updated without causing the application 310 to reload the information resource 110. Examples of function calls include JavaScript or XML requests (e.g., asynchronous JavaScript and XML) sent to the data processing system 210, the content provider device 215, or the content publisher device 220 or invocations of an event listener (e.g., onClick, onMouseWheel, etc.). Examples of data objects include JavaScript or XML data (e.g., in JavaScript Object Notation) received from the data processing system 210, the content provider device 215, or the content publisher device 220. The data objects may include, for example, attribute-value pairs specifying the content element 115A-115N, the property of the content element 115A-115N, and the value to which the property of the content element 115A-115N is to be changed. The function calls and receipt of data objects may be used by the application 310 to change, modify, or otherwise alter the information resource 110A and the one or more content elements 115A-115N without causing reloading of the information resource 110A or another information resource.

The content modification script 318 may be used to maintain or allow modifications or alterations of the one or more content elements 115A-115N. The content modification script 318 can be a script, logic, executable code, or process running on the client device 225 for modifying the information resource 110 or the one or more content elements 115A-115N therein. The content modification script 318 can include an event detector 320, a policy enforcer 322, a comparator 324, a counter 326, a timer 328, and a policy database 330. Each of the event detector 320, the policy enforcer 322 the comparator 324, the counter 326, and the timer 328 can be an application, service, server, daemon, or other executable logic for modifying the information resource 110 or the content elements 115A-115N thereof. The policy database 350 can include one or more predefined trigger events and a change list. The one or more predefined trigger events may be a specified type of function call (e.g. "xhttp.open("GET", . . . )" or "onClick( )") or a specified type of data object (e.g., "xhttp.responseText" or "xhttp.responseXML"). The change list may specify one or more conditions and values for changing one or more properties of the content elements 115A-115N based on satisfying the one or more conditions.

In the context of FIG. 3, the event detector 320 can detect an occurrence of one or more of the predefined trigger events. The one or more predefined trigger events can include, for example, specified function calls, receipt of data objects, or any change to any of the one or more content elements 115A-115N. The event detector 320 can identify the function call, receipt of data object, or a type of change to any of the one or more content elements 115A-115N. The event detector 320 can parse the identified function call, the data object, or the type of change to any of the one or more content elements 115A-115N. In some implementations, the event detector 320 can access the policy database 330 for the one or more predefined trigger events. In conjunction with the comparator 324, the event detector 320 can then compare the identified function call, the identified data object, or the type of change. The event detector 320 can determine whether any of the one or more predefined trigger events is met. For example, one of the predefined trigger events may include data objects specifying a change in the size and position of one of the content elements 115A-115N. In this example, the event detector 320 can detect receipt of a data object and parse the data object to determine whether the data object specifies the same change as one of the predefined trigger events.

The event detector 320 can determine whether the information resource 110A or the one or more content elements 115A-115N satisfy the one or more conditions of the change list. Each of the one or more conditions of the change list can correspond to an activation state or condition, a reactivation state or condition, or a deactivation state or condition of the information resource 110A. Each of the activation state, the reactivation state, and the deactivation state may be predefined. The activation state and the reactivation state may correspond to a full loading of a single state or a single virtual page of an asynchronous web application (e.g., information resource 110A). In some implementations, the full loading of a single state may correspond to a loading and full processing of a new information resource. The activation state and the reactivation state may include relatively minor modifications by the function calls or data object to the one or more content elements 115A-115N. Examples of minor changes for the activation state may include changing of text, color, font size, or image of a content element 115A-115N, among others. Examples of minor changes for the reactivation state may include changing of text, font size, size, or position of a content element 115A-115N and addition or elimination of a few new content elements 115A-115N (<10), among others. The deactivation state may correspond to a transition to another state or another virtual page of the asynchronous web application. The deactivation state may include relatively major modifications by the function calls or data object to the one or more content elements 115A-115N. Examples of major changes may include changing of size or position of content elements 115A-115N above a predefined threshold, addition or elimination of many content elements 115A-115N (>=10), changing of an address (in whole or in part) associated with the information resource 110A or the content element 115A-115N among others.

In some implementations, the event detector 320 can determine whether the function call or the data object corresponding to the occurrence of the predefined trigger event is completed processing by the application 310. For example, the event detector 320 can retrieve or otherwise invoke the properties of the XMLHttpRequest object (e.g., ready State or status) to determine that the function call or the data object is completed processing. Responsive to determining that the function call or the data object corresponding to the occurrence of the predefined trigger is completed, the event detector 320 can determine whether the one or more conditions of the change list are satisfied. In some implementations, the event detector 320 can identify changes to the information resource 110A the one or more content elements 115A-115N. In some implementations, in conjunction with the comparator 324, the counter 326, and the timer 328, the event detector 320 can compare the identified changes to the one more conditions of the change list to determine whether the information resource 110A or the one or more content elements 115A-115N satisfy the one or more conditions of the change list.

The event detector 320 can determine that the information resource 110A or the content elements 115A-115N satisfy the activation condition of the change list. In some implementations, in conjunction with the comparator 324, the event detector 320 can compare the function call or the data object to the one or more conditions of the change list corresponding to the activation condition. If there is a match between the function call or the data object to any of the one or more conditions of the change list, the event detector 320 may determine that the information resource 110A or the one or more content elements 115A-115N satisfy the activation condition. In some implementations, in conjunction with the counter 326, the event detector 320 can identify a number of content elements 115A-115N changed on, newly added to, or removed from the information resource 110A. In some implementations, in conjunction with the comparator 324, the event detector 320 can compare the identified number of content elements 115A-115N to a threshold of the change list. In some implementations, if the number of changed content elements 115A-115N is less than or equal to the threshold, the event detector 320 can determine that the information resource 110A or the one or more content elements 115A-115N satisfy the activation condition. In some implementations, in conjunction with the timer 328, the event detector 320 can identify a timespan since the most recent function call or receipt of the data object. In some implementations, in conjunction with the comparator 324, the event detector 320 can compare the timespan since the most recent function call or receipt of the data object to a threshold time. In some implementations, if the timespan is less than or equal to the threshold time, the event detector 320 can determine that the information resource 110A or the one or more content elements 115A-115N satisfy the activation condition.

In some implementations, the policy enforcer 322 can transmit a request for the change list to the data processing system 210, the content provider device 215, or the content publisher device 220, responsive to determining that the information resource 110A or the content elements 115A-115N satisfy the activation condition of the change list. The request can include content element identifiers corresponding to each content element 115A-115N of the information resource 110A and the one or more properties of each of the content elements 115A-115N on the information resource 110A. The data processing system 210, the content provider device 215, or the content publisher device 220 receiving the request can select the change list based on the content element identifiers and the one or more properties of each of the content elements 115A-115N on the information resource 110A. The policy enforcer 322 can subsequently receive the change list from the data processing system 210, the content provider device 215, or the content publisher device 220.

The policy enforcer 322 can set the one or more properties of each content element 115A-115N to one or more values specified in the change list, responsive to determining that the information resource 110A or the content elements 115A-115N satisfy the activation condition of the change list. The change list may specify the one or more values for changing the one or more properties of each content element 115A-115N. Examples of one or more values for changing the one or more properties of each content element 115A-115N may include changes to the visual characteristics or the corresponding style rule (e.g., color, alignment, font size, font, etc.), changes to an attribute (e.g., target address of a hyperlink, source address of an image file, CSS selectors, etc.), changes to text (e.g., replacing, inserting, or appending existing text), changes to the HTML markup corresponding to the content element 115A-115N (e.g., replacing, inserting, or appending the corresponding HTML markup, JavaScript, or CSS, etc.), and changes to reordering (e.g., location or placement of the content element 115A-115N within the object model 400A), among others. To avoid flickering of the rendering 405A of the information resource 110A, the executable script corresponding to the policy enforcer 322 (and the content modification script 318) may be placed prior the executable script corresponding to the one or more content elements 115A-115N in executable script of the information resource 110A. In this manner, the application 310, the resource parser 314, or the content renderer 316 may read and parse the change list prior to applying specified changes to the content elements 115A-115N. In some implementations, in conjunction with the timer 328, the policy enforcer 22 can temporarily disable a visible property of the content element 115A-115N to be changed to prevent flickering of the rendering 405A of the information resource 110A. By preventing flickering, the content modification script 318 may modify content elements 115A-115N without significantly affecting human-computer interactions with the information resource 110A. In some implementations, the initial or default values of the one or more properties of each of the content elements 115A-115N changed using the change list can be maintained or stored at the policy database 330.

The policy enforcer 322 can identify the one or more content elements 115A-115N of the information resource 110A. In some implementations, for each content element 115A-115N identified, the policy enforcer 322 can identify the one or more values for the one or more properties specified in the change list. In some implementations, the change list may specify content element identifiers (e.g., alphanumeric or hash values, etc.) for the one or more values of the one or more properties of the content elements 115A-115N to be changed. In some implementations, in conjunction with the comparator 324, the policy enforcer 322 can compare the content element identifiers to the content elements 115A-115N identified on the information resource 110A. In some implementations, the policy enforcer 322 can iterate through the identified content elements 115A-115N to set the one or more properties of each content element 115A-115N to the one or more values specified in the change list. In some implementations, the policy enforcer 322 can set the one or more properties of each content element 115A-115N to the one or more values specified in the change list, responsive to determining a match between the content element identifier of the change list to the identifier content element 115A-115N.

In some implementations, the policy enforcer 320 can generate a new style rule to replace the style rule 415A-N based on the one or more values specified by the change list for the content element 115A-115N to be changed. For example, when the change list specifies changes to the style rule 415A-N corresponding to the content element 115A-115N, the policy enforcer 320 can generate a new set of CSS style rules. In some implementations, the policy enforcer 320 can add an override tag (e.g., "!important") specifying the application 310 and the resource parser 314 to parse and execute the new style rule. In some implementations, the policy enforcer 320 can add the override tag, responsive to determining that the new style rule conflicts with the previous style rule. For example, the color specified originally for the content element 115A-115N may be red and the change list may specify that the color is to be change to green. In this example, the policy enforcer 320 can generate a new style rule specifying the color of the content element 115A-115N is to be green and can add an "important!" tag to the CSS style rule to override the previous CSS style rule.

The policy enforcer 322 can add, insert, or tag a modification indicator to each content element changed using change list. In subsequent applications of the change list, the modification indicator can indicate to the policy enforcer 322 to prevent modification of the content element 115A-115N while the information resource 110A or the one or more content elements 115A-115N satisfy the activation condition or the reactivation condition. The modification indicator may be a tag inserted into the executable script corresponding to the content element 115A-115N. In some implementations, the modification indicator can include a treatment specifier and a content element identifier corresponding to the content element 115A-115N changed using the change list. The treatment specifier can indicate whether the content element 115A-115N has been or is changed using the change list. In some implementations, the treatment specifier can indicate which condition or state the information resource 110A or the respective content element 115A-115N is in (e.g., the activation, the reactivation, or the deactivation condition).

The policy enforcer 322 can maintain a modification sequence list. The modification sequence list can include one or more content element identifiers corresponding to the content elements 115A-115N changed using the change list in order or in sequence. The policy enforcer 322 can add the one or more content elements identifiers corresponding to the content elements 115A-115N changed using the change list. In some implementations, the policy enforcer 322 can use the modification sequence list to revert the one or more properties of each of the content elements 115A-115N changed using the change list to the original values in the order or the sequence in the modification sequence list. The reversion of the one or more properties of each of the content elements 115A-115N changed using the change list may be done in the order specified in the modification sequence list as some of the changes specified in the change list may be order specific (e.g., changing of the hierarchical position of the content element 115A-115N in the object model 400A).

In some implementations, the policy enforcer 322 can maintain or store the modification sequence list in the policy database 320.

Figure 4B:
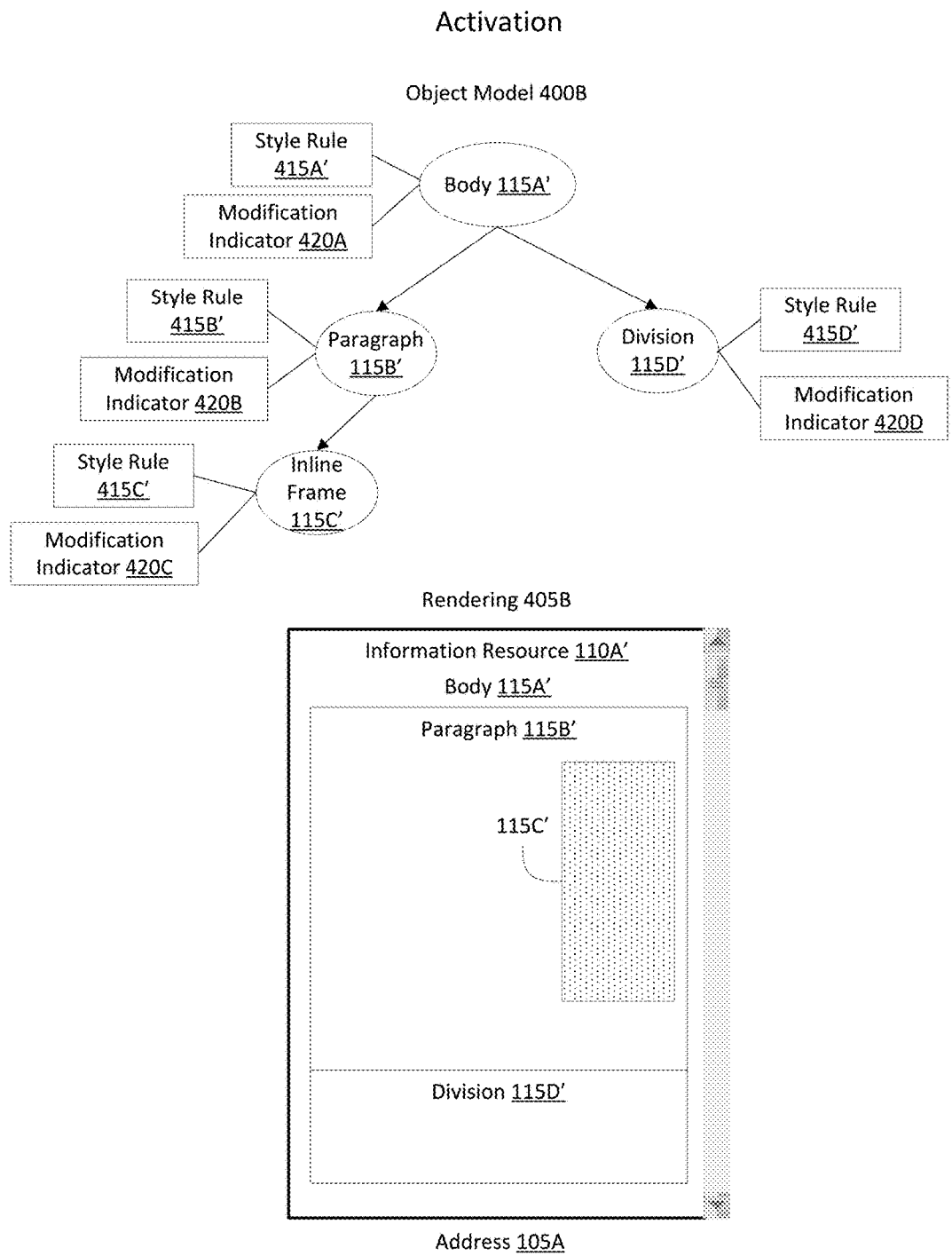
FIG. 4B is a block diagram depicting an object model and a rendering of an information resource with content elements modified by the content modification script when activated, according to an illustrative implementation.

Now referring briefly to FIG. 4B, illustrated is a block diagram depicting an object model 400B and a rendering of an information resource 110A' with content elements 115A' modified by the content modification script when activated, according to an illustrative implementation. In the example depicted in FIG. 4B, the event detector 320 may have determined that the information resource 110A is in an activation state. Furthermore, the object model 400B may have been modified. Despite the changes on the information resource 110A, the address 105A may be maintained. The policy enforcer 322 may have applied changes to each of the content elements 115A-D' as specified in the change list. The change list may specify that the size of the paragraph 115B' is to be larger. The change list may specify that the alignment of the inline frame 115C is to be on the right and color changed of the inline frame 115C is to be changed. In addition, the policy enforcer 322 may have added a modification indicator 420A-D to each of the content elements 115A-D' changed using the change list. In response to the changes in the visual properties of the content elements 115A-D', the content renderer 318 may have re-rendered and displayed the rendering 405B of the modified information resource 110A'.

As the information resource 110A' may be an asynchronous web application (e.g., single web application), the information resource 110 or the one or more content elements 115A-115N may be dynamically and continuously modified, altered, or otherwise updated via function calls to and receipt of data objects from the data processing system 210, the content provider device 215, or the content publisher device 220. In some implementations, the application 310 can receive one or more new content elements 115A-115N from the data processing system 210, the content provider device 215, or the content publisher device 220. In some implementations, the receipt one or more new content elements 115A-115N may include a receipt of a data object specifying generation of the one or more new content elements 115A-115N at the client device 225 from the data processing system 210, the content provider device 215, or the content publisher device 220. In some implementations, the application 310 may insert the received one or more new content elements 115A-115N into the information resource 110A'.

Figure 4C:
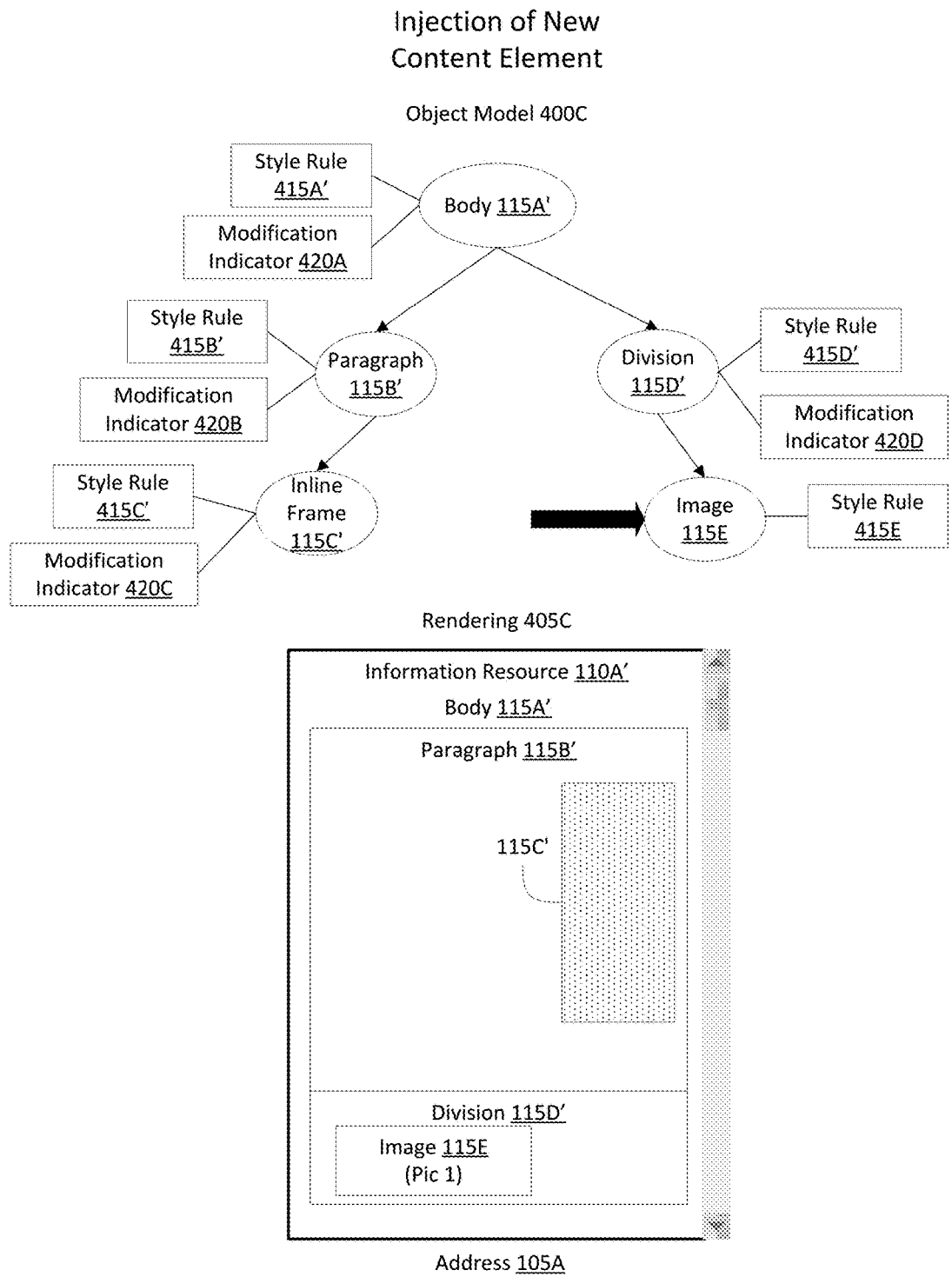
FIG. 4C is a block diagram depicting an object model and a rendering of an information resource with a new content element, according to an illustrative implementation.

Now referring briefly to FIG. 4C, illustrated is a block diagram depicting an object model 400C and a rendering of an information resource 110A' with a new content element 115E, according to an illustrative implementation. In the example depicted in FIG. 4C, the application 310 may have received a new image element 115E to insert into the information resource 110 A' within the division element 115D' from the data processing system 210, the content provider device 215, or the content publisher device 220. The application 310 may have also retrieve an image file ("PIC1") as specified in a source address for the image file in the new image element 115E. The resource parser 314 may have updated the object model 400C to include the image element 115E under the division element 115D'. In contrast to the previously existing content elements 115A-D', the image element 115E may not yet correspond to a modification indicator. While FIG. 4C shows the originally specified placement of the image element 115E in the rendering 405C, the content modification script 318 may change the image element 115E prior to rendering by the content renderer 316. In addition, despite the changes on the information resource 110A', the address 105A may be maintained.

In the context of FIG. 3, the event detector 320 can detect a subsequent occurrence of one or more of the predefined trigger events. In some implementations, the one or more predefined trigger events can include addition of new content elements 115A-115N or removal of existing content elements 115A-115N on the information resource 110. The event detector 320 can identify the function call, receipt of data object, or a type of change to any of the one or more content elements 115A-115N'. The event detector 320 can parse the identified function call, the data object, or the type of change to any of the one or more content elements 115A-115N'. In some implementations, the event detector 320 can access the policy database 330 for the one or more predefined trigger events. In conjunction with the comparator 324, the event detector 320 can then compare the identified function call, the identified data object, or the type of change. The event detector 320 can determine whether any of the one or more predefined trigger events is met.

In some implementations, the detected function call may correspond to a change of one or more values of the one or more properties of the content element 115A-115N with a modification indicator 420. For example, an interaction event may cause the size of one of the one or more content elements 115A-115N previously set using the change list. In some implementations, the event detector 320 can detect which of the one or more content elements 115A-115N corresponds to the detected function call. In some implementations, the event detector 320 can determine whether the detected function call causes change of one or more values of the one or more properties of the content element 115A-115N. In some implementations, the event detector 320 or the policy enforcer 322 can identify the modification indicator 420A-N corresponding to the identified content element 115A-115N. IN some implementations, the event detector 320 or the policy enforcer 322 can remove the modification indicator 420A-N from the identified content element 115A-115N. In some implementations, the event detector 320 or the policy enforcer 322 can set the treatment specifier for the modification indicator 420A-N to the deactivation condition, allowing subsequent changes from the change list.

The event detector 320 can again determine whether the information resource 110A or the one or more content elements 115A-115N satisfy the one or more conditions of the change list. Each of the one or more conditions of the change list can correspond to an activation state or condition, a reactivation state or condition, or a deactivation state or condition of the information resource 110A'. Each of the activation state, the reactivation state, and the deactivation state may be predefined. In some implementations, the event detector 320 can determine whether the function call or the data object corresponding to the occurrence of the predefined trigger event is completed processing by the application 310.

The event detector 320 can determine that the information resource 110A', the content elements 115A-115N', or the newly added content elements 115A-115N satisfy the reactivation condition of the change list. In some implementations, in conjunction with the comparator 324, the event detector 320 can compare the function call or the data object to the one or more conditions of the change list corresponding to the reactivation condition. If there is a match between the function call or the data object to any of the one or more conditions of the change list, the event detector 320 may determine that the information resource 110A', the one or more content elements 115A-115N', or the newly added content elements 115A-115N satisfy the reactivation condition. In some implementations, in conjunction with the counter 326, the event detector 320 can identify a number of content elements 115A-115N and the newly added content elements 115A-115N changed on, newly added to, or removed from the information resource 110A. In some implementations, in conjunction with the comparator 324, the event detector 320 can compare the identified number of content elements 115A-115N' and the newly added content elements 115A-115N to a threshold of the change list. In some implementations, if the number of changed content elements 115A-115N' and the newly added content elements 115A-115N is less than or equal to the threshold, the event detector 320 can determine that the information resource 110A, the one or more content elements 115A-115N', or the newly added content elements 115A-115N satisfy the activation condition. In some implementations, in conjunction with the timer 328, the event detector 320 can identify a timespan since the most recent function call or receipt of the data object. In some implementations, in conjunction with the comparator 324, the event detector 320 can compare the timespan since the most recent function call or receipt of the data object to a threshold time. In some implementations, if the timespan is less than or equal to the threshold time, the event detector 320 can determine that the information resource 110A', the one or more content elements 115A-115N', or the newly added content elements 115A-115N satisfy the reactivation condition.

In some implementations, the policy enforcer 322 can transmit a request for the change list to the data processing system 210, the content provider device 215, or the content publisher device 220, responsive to determining that the information resource 110A', the content elements 115A-115N', or newly added content elements 115A-115N satisfy the reactivation condition of the change list. The request can include content element identifiers corresponding to each content element 115A-115N' and newly added content element 115A-115N of the information resource 110A' and the one or more properties of each of the content elements 115A-115N' and the newly added content elements 115A-115N' on the information resource 110A. The data processing system 210, the content provider device 215, or the content publisher device 220 receiving the request can select the change list based on the content element identifiers and the one or more properties of each of the content elements 115A-115N' and newly added content elements 115A-115N on the information resource 110A'. The policy enforcer 322 can subsequently receive the change list from the data processing system 210, the content provider device 215, or the content publisher device 220.

The policy enforcer 322 can identify the content elements 115A-115N corresponding to each of the modification indicators 420A-N. The policy enforcer 322 can identify content elements 115A-115N (e.g., newly added content elements) without modification indicators 420A-N. In some implementations, the policy enforcer 322 can identify the treatment specifier of the modification indicator 420A-N. The content elements 115A-115N without modification indicators 420A-N may indicate a lack of change using the change list of the content modification script 318. By identifying content elements 115A-115N with and without the modification indicators 420A-N, the policy enforcer 322 can identify the content elements 115A-115N for which the one or more values of the one or more properties of the change list is not to apply and to apply respectively. In this manner, the policy enforcer 322 may prevent multiple changes or instantiations of the content elements 115A-115N previously changed using the change list (e.g., reordering change). For example, without the modification indicator 420A-N, multiple instantiations of the content elements 115A-115N may result from the hierarchal order of the content element 115A-115N being previously changed using the change list. In addition, the modification indicator 420A-N may allow for testing of variations of the information resource 110 and content elements 115A-115N to measure interaction rates. Using the measured interaction rates, the data processing system 210, the content provider device 215, or the content publisher device 225 may find an optimal variation of the information resource 110 (e.g., highest interaction rates).

The policy enforcer 322 can set the one or more properties of the content elements 115A-115N without modification indicators 420A-N to one or more values specified in the change list, responsive to determining that the information resource 110A', the content elements 115A-115N', or the newly added content elements 115A-115N satisfy the reactivation condition of the change list. In some implementations, the policy enforcer 322 can set the one or more properties of the content elements 115A-115N' with treatment specifiers indicating the deactivation condition to the one or more values specified in the change list. The change list may specify the one or more values for changing the one or more properties of each content element 115A-115N without modification indicators 420A-N. In some implementations, in conjunction with the timer 328, the policy enforcer 22 can temporarily disable a visible property of the newly added content element 115A-115N' to be changed to prevent flickering of the rendering 405A of the information resource 110A. By preventing flickering, the content modification script 318 may modify newly added content elements 115A-115N without significantly affecting human-computer interactions with the information resource 110A'. In some implementations, the initial or default values of the one or more properties of each of the content elements 115A-115N changed using the change list can be maintained or stored at the policy database 330.

The policy enforcer 322 can identify the one or more content elements 115A-115N without modification indicators 420A-N of the information resource 110A'. In some implementations, for each content element 115A-115N identified as not corresponding to one of the modification indicators 420A-N, the policy enforcer 322 can identify the one or more values for the one or more properties specified in the change list. In some implementations, in conjunction with the comparator 324, the policy enforcer 322 can compare the content element identifiers to the content elements 115A-115N identified on the information resource 110A as not corresponding to one of the modification indicators 420A-N. In some implementations, the policy enforcer 322 can iterate through the identified content elements 115A-115N to set the one or more properties of each content element 115A-115N to the one or more values specified in the change list. In some implementations, the policy enforcer 322 can set the one or more properties of each content element 115A-115N identified as not corresponding to the modification indicators 420A-N to the one or more values specified in the change list, responsive to determining a match between the content element identifier of the change list to the identifier content element 115A-115N. The policy enforcer 322 can add, insert, or tag a modification indicator to each content element 115A-115N identified as previously not corresponding to one of the modification indicators 420A-N changed using change list.

The policy enforcer 322 can also add to the modification sequence list one or more content elements identifiers corresponding to the content elements 115A-115N previously without a modification indicator 420A-N changed using the change in the order or sequence modified. The policy enforcer 322 can also maintain the one or more properties of the content elements 115A-115N' corresponding to one of the modification indicators 420A-N.

Figure 4D:
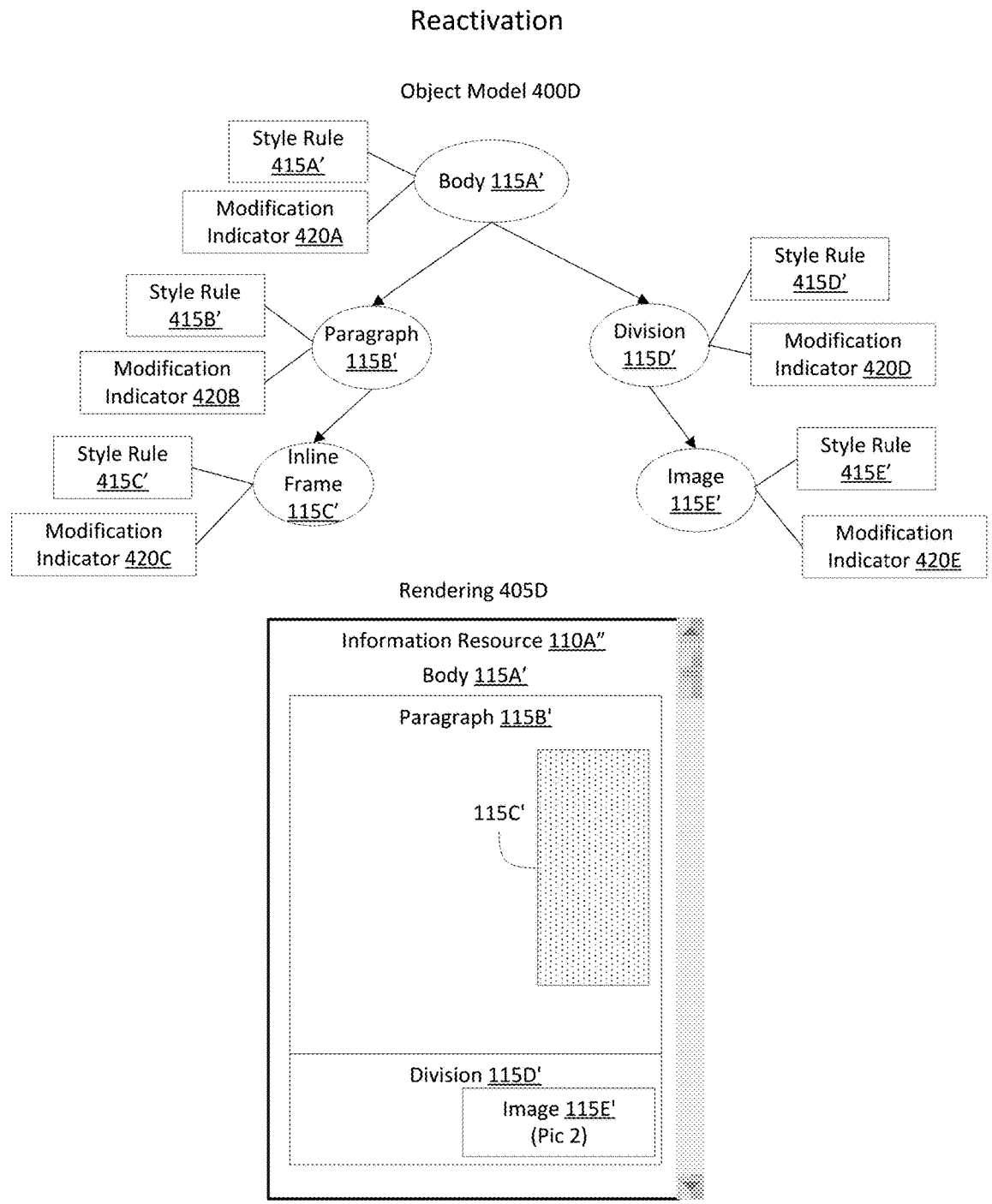
FIG. 4D is a block diagram depicting an object model and a rendering of an information resource with content elements modified by the content modification script when reactivated, according to an illustrative implementation.

Referring briefly to FIG. 4D, illustrated is a block diagram depicting an object model 400D and a rendering 405C of an information resource 110A" with content elements 115A-115E modified by the content modification script 318 when reactivated, according to an illustrative implementation. In the example depicted in FIG. 4D, the event detector 320 may have determined that the information resource 110A' satisfies the reactivation condition of the change list. Subsequently, the policy enforcer 322 may have identified the four content elements 115A-D as previously changed using the change list from the modification indicator 420A-N. The policy enforcer 322 may have also identified the image element 115E as not previously changed using the change list from the lack of a modification indicator 420A-N. The policy enforcer 322 may then apply the changes specified in the change list of the policy database 330 to the image element 115E, as this content element is identified as not having been changed from the lack of a modification indicator 420A-N. Conversely, the policy enforcer 322 may also maintain the changes previously applied to the other four content elements 115A-D as these content elements 115A-D may have a corresponding modification indicator 420A-D. In this example, the change list may specify that the image element 115E is to be aligned to the right and have a different image file displayed (PIC2). Having applied the changes to the image element 115E, the policy enforcer 322 may then add or insert a modification indicator 420 to the image element 115E'. The resource parser 314 may update the object model 400D in accordance to the changes applied. The content renderer 316 may then re-render the information resource 110A" and display the rendering 405D of the information resource 110A" on the client device 225. Despite the changes on the information resource 110A", the address 105A may be maintained as the information resource 110A" may be an asynchronous web application.

The event detector 320 can detect a subsequent occurrence of one or more of the predefined trigger events. The subsequent occurrence of the one or more of the predefined trigger events may be, for example, subsequent to the activation condition (e.g., as depicted FIG. 4B) or the reactivation condition (e.g., as depicted in FIGS. 4C and 4D). The event detector 320 can identify the function call, receipt of data object, or a type of change to any of the one or more content elements 115A-115N'. In some implementations, the one or more predefined trigger events can include addition of new content elements 115A-115N or removal of existing content elements 115A-115N on the information resource 110. The event detector 320 can parse the identified function call, the data object, or the type of change to any of the one or more content elements 115A-115N'. In some implementations, the event detector 320 can access the policy database 330 for the one or more predefined trigger events. In conjunction with the comparator 324, the event detector 320 can then compare the identified function call, the identified data object, or the type of change. The event detector 320 can determine whether any of the one or more predefined trigger events is met.

The event detector 320 can again determine whether the information resource 110A" or the one or more content elements 115A-115N' satisfy the one or more conditions of the change list. Each of the one or more conditions of the change list can correspond to an activation state or condition, a reactivation state or condition, or a deactivation state or condition of the information resource 110A". Each of the activation state, the reactivation state, and the deactivation state may be predefined. In some implementations, the event detector 320 can determine whether the function call or the data object corresponding to the occurrence of the predefined trigger event is completed processing by the application 310.

The event detector 320 can determine that the information resource 110A", the content elements 115A-115N' satisfy the deactivation condition of the change list. In some implementations, the deactivation condition is satisfied by not satisfying the activation condition. In some implementations, in conjunction with the comparator 324, the event detector 320 can compare the function call or the data object to the one or more conditions of the change list corresponding to the deactivation condition. If there is no match between the function call or the data object to any of the one or more conditions of the change list, the event detector 320 may determine that the information resource 110A" or the one or more content elements 115A-115N' satisfy the deactivation condition. In some implementations, in conjunction with the counter 326, the event detector 320 can identify a number of content elements 115A-115N' changed on, newly added to, or removed from the information resource 110A". In some implementations, in conjunction with the comparator 324, the event detector 320 can compare the identified number of content elements 115A-115N' to a threshold of the change list. In some implementations, if the number of changed content elements 115A-115N' is greater than or equal to the threshold, the event detector 320 can determine that the information resource 110A" or the one or more content elements 115A-115N' satisfy the deactivation condition. In some implementations, in conjunction with the timer 328, the event detector 320 can identify a timespan since the most recent function call or receipt of the data object. In some implementations, in conjunction with the comparator 324, the event detector 320 can compare the timespan since the most recent function call or receipt of the data object to a threshold time. In some implementations, if the timespan is greater than or equal to the threshold time, the event detector 320 can determine that the information resource 110A" or the one or more content elements 115A-115N' satisfy the deactivation condition.

The policy enforcer 322 can identify the content elements 115A-115N corresponding to each of the modification indicators 420A-N, responsive to determining that the information resource 110A" or the one or more content elements 115A-115N satisfy the deactivation condition. The policy enforcer 322 can identify content elements 115A-115N (e.g., newly added content elements) without modification indicators 420A-N. The content elements 115A-115N without modification indicators 420A-N may indicate a lack of change using the change list of the content modification script 318. The policy enforcer 322 can also identify the content elements 115A-115N with or without the modification indicators 420A-N from the modification sequence list maintained at the policy database 330. The policy enforcer 322 can reset the one or more values of the one or more properties of the content elements 115A-115N identified as corresponding to one of the modification indicators 420A-N to the default or initial values.

The policy enforcer 322 can reset the one or more values of the one or more properties of each of the content elements 115A-115N to the initial or default values, responsive to determining that the information resource 110 or the one or more content elements 115A-115N satisfy the deactivation condition. In some implementations, the policy enforcer 322 can reset the one or more values of the one or more properties of each of the content elements 115A-115N identified as corresponding to one of the modification indicators 420A-N. In some implementations, the policy enforcer 322 can identify the initial or default values of each of the content elements 115A-115N from the policy database. In some implementations, the policy enforcer 322 can identify the initial or default values of each of the content elements 115A-115N from the original executable script of the information resource 110. For example, as the information resource 110 may be an asynchronous web application, the initial or default values of each of the content elements 115A-115N may remain in the original executable script of the information resource 110 subsequent to applying changes specified in the change list. In some implementations, the policy enforcer 322 can remove each of the modification indicators 420A-N for the corresponding content element 115A-115N, while resetting the one or more values of the one or more properties of the corresponding content element 115A-115N. In some implementations, the policy enforcer 322 can remove all of the modification indicators 420A-N from the information resource 110A", responsive to determining that the information resource 110 or the one or more content elements 115A-115N satisfy the deactivation condition.

In some implementations, the policy enforcer 322 can reset the one or more values of the one or more properties of each of the content elements 115A-115N in the order or sequence specified in the modification sequence list, responsive to determining that the information resource 110 or the one or more content elements 115A-115N satisfy the deactivation condition. The order or sequence may be first-in-first-out (FIFO), first-in-last-out (FILO), last-in-first-out (LIFO), or last-in-last-out (LILO), among others. In some implementations, the policy enforcer 322 can identify the content element identifiers of the modification sequence list. Each of the content element identifiers may correspond to a content element 115A-115N of the information resource 110. In some implementations, the policy enforcer 322 can iterate through the modification sequence list in the specified order or sequence to identify each content element 115A-115N corresponding to the each of the content element identifiers of the modification sequence list. In some implementations, for each identified content element 115A-115N, the policy enforcer 322 can identify or retrieve the initial or default values for the one or more properties of the content element 115A-115N. In some implementations, the policy enforcer 322 can reset the one or more properties of the content element 115A-115N to the initial or default values. Reverting the values of the properties of the content elements 115A-115N in this manner may allow for testing of multiple variations of the information resource 110 to measure the interaction rates thereon. Each of the multiple variations of the information resource 110 may change the content elements 115A-115N differently without regard to prior or subsequent variations. In addition, some changes specified in the change list of the content modification script 318 may be sequence or order dependent (e.g., changing hierarchical order in the object model).

Figure 4E:
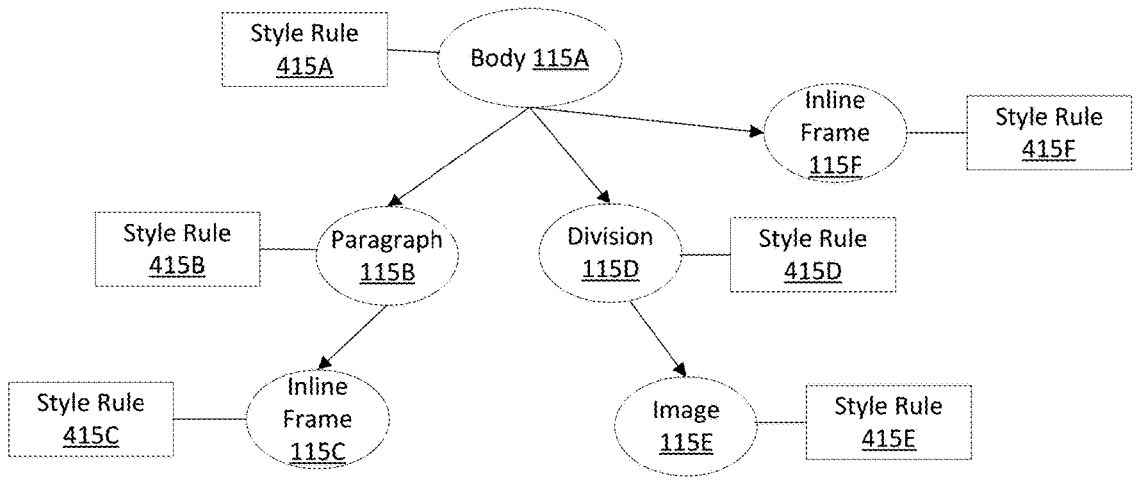
FIG. 4E is a block diagram depicting an object model and a rendering of an information resource with content elements modified by the content modification script when deactivated, according to an illustrative implementation.
Figure 4E:
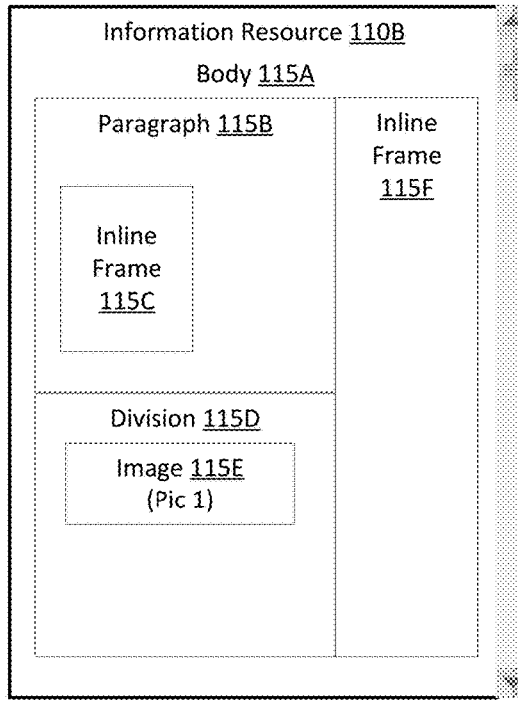

Referring briefly to FIG. 4E, illustrated is a block diagram depicting an object model 400E and a rendering 405E of an information resource 110B with content elements 115A-E modified by the content modification script 318 when deactivated, according to an illustrative implementation. In the example depicted in FIG. 4E, a prior interaction, function call, or event on the information resource 110A" may have caused a major change to the constituent content elements of the information resource 110A" such as the addition of a new inline frame 115F with a corresponding style rule 415A of a size above a predetermined threshold. The resource parser 314 can update the object model 400E to include the inline frame element 115F. This transition may correspond to another information resource 110B of the same address 105A. Multiple information resources 110A and 110B may correspond to the same web page, as the information resources 110A and 110B may be an asynchronous web application. Upon detecting the interaction, function call, or event, the event detector 320 may have determined that the change to the information resource 110A" or the content elements 115A-E now satisfies the deactivation condition. Responsive to the determination that the information resource 110A" or the content elements 115A-E now satisfy the deactivation condition, the policy enforcer 322 may reset the values of the properties of the content elements 115A-D previously changed using the change list to the default or initial value. In addition, the policy enforcer 322 may remove the modification indicators 420A-D from each content element 115A-D. Subsequently, the content renderer 316 can re-render the information resource 110B and display the rendering 405E of the information resource 110B on the output display device of the client device 225.

Figure 5:
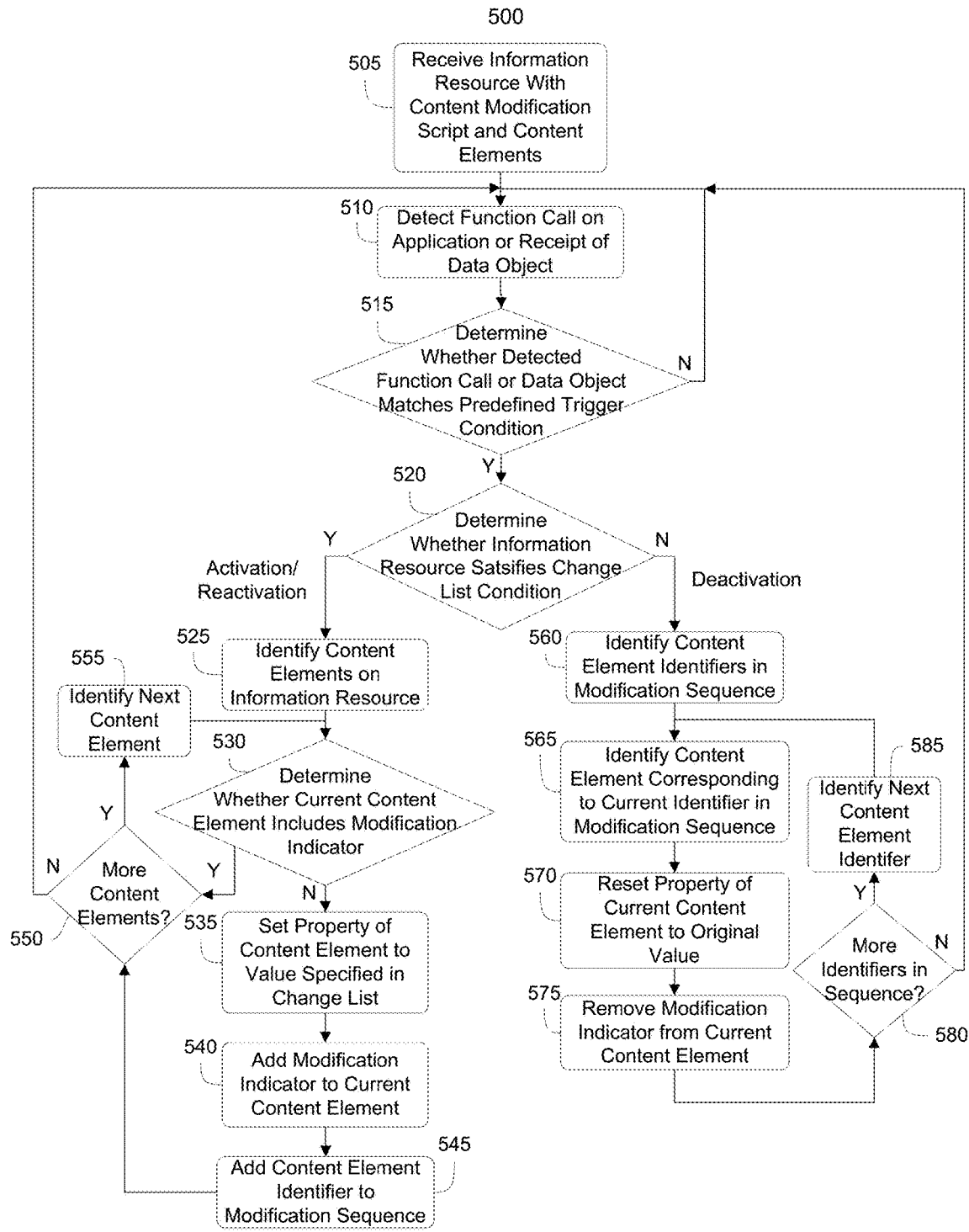
FIG. 5 is a flow chart depicting a method of dynamically modifying properties of content elements within information resources, according to an illustrative implementation.
Figure 6:
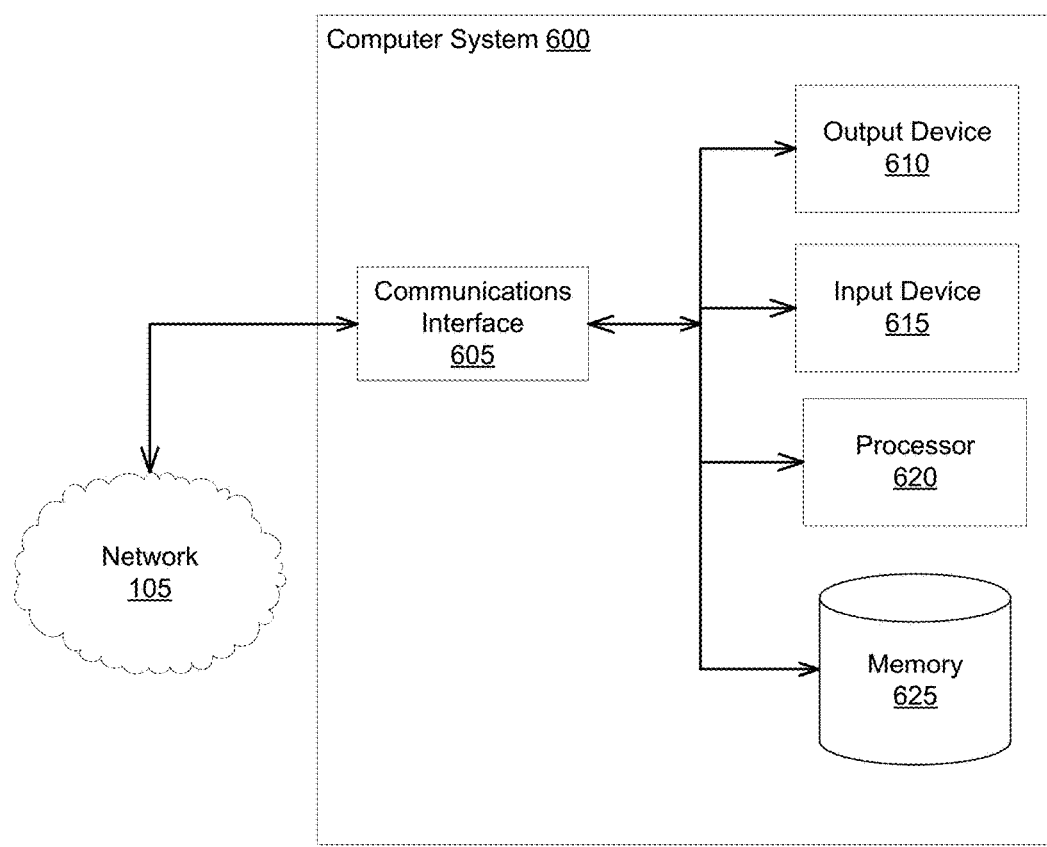
FIG. 6 is a block diagram illustrating a general architecture for a computer system that may be employed to implement elements of the systems and methods described and illustrated herein, according to an illustrative implementation.

FIG. 5 is a flow diagram depicting a method 500 of dynamically modifying properties of content elements within information resources by client-side computing devices, according to an illustrative implementation. The functionality described herein with respect to method 400 can be performed or otherwise executed by the data processing system 210 or client device 225 as shown in FIG. 2, the content render modification system 300 as shown in FIG. 3, or a computing device as shown in FIG. 6, or any combination thereof.

In further detail, a computing device can receive an information resource with a content modification script and content elements (step 505). For example, the computing device (e.g., client device 225) can transmit a request for content to a server (e.g., the data processing system 210, content publisher device 215, or content provider device 220). The computing device can subsequently receive the information resource from the server. The information resource may include one or more content elements and the content modification script. The information resource may be, for example, an asynchronously updated web application, using JavaScript and XML (AJAX) function calls and receipt of JavaScript Object Notation (JSON) data objects to continuously and dynamically modify the information resource and the content elements thereon. The content modification script can include a predefined trigger condition and a change list. The change list may be used to change or set the values of the properties of the content elements of the information resource based on the condition or state of the information resource.

The computing device can detect a function call or receipt of a data object (step 510). Examples of function calls include JavaScript or XML requests (e.g., asynchronous JavaScript and XML) sent to the server (e.g., the data processing system 210, content publisher device 215, or content provider device 220) or interaction events (e.g., event listener). Examples of d at objects include JavaScript or XML data (e.g., in JavaScript Object Notation) received from the server. The function calls and data objects may be used by an application of the computing device to dynamically modify the information resource and the content elements therein.

The computing device can determine whether the detected function call or data object matches a predefined trigger condition (step 515). For example, the computing device can parse the function call or data object. The computing device can then compare the function call or the data object to the predefined trigger condition to determine whether the function call or the data object matches the predefined trigger condition. Examples of the predefined trigger events can include specified function calls, receipt of data objects, or any change to any of the content elements on the information resource.

If the detected function call or data object matches the predefined trigger condition, the computing device can determine whether the information resource satisfies a condition of the change list (step 520). For example, subsequent to processing the function call or the data object, the computing device can determine whether the information resource or the content elements therein satisfy the condition of the change list. Satisfying the condition of the change list may correspond to an activation or reactivation condition. The activation state and the reactivation state may correspond to a full loading of a single state or a single virtual page of an asynchronous web application. The activation state and the reactivation state may include relatively minor modifications to the information resource. The deactivation state may correspond to a transition to another state or another virtual page of the asynchronous web application. The deactivation state may include relatively major modifications by to the information resource.

If the information resource corresponds to an activation or reactivation condition, the computing device can identify content elements on the information resource (step 525). For example, the computing device can parse the information resource to identify the content elements therein. The computing device can generate an object model for the information resource based on the content elements. The object model can include nodes arranged in a hierarchical order. Each node can correspond to a content element in the information resource. The computing device can iterate through the content elements of the information resource.

The computing device can determine whether current content element includes a modification indicator (step 530). The modification indicator may identify the content elements prevented from further changes applied using the change list of the content modification script, while the information resource or the content element satisfies the activation or reactivation condition. Each content element previously modified using the change list may be tagged with the modification indicator. While iterating through the content elements of the information resource, the computing device may determine whether the current content elements has a corresponding modification indicator. If the current content element has a corresponding modification indicator, the computing device may go to step 550, the functionalities of which is detailed below.

If the current content element does not the modification indicator, the computing device can set the property of the content element to the value specified in the change list (step 535). Examples of changes specified in the change list may include changing the property of content element may include changes to the visual characteristics or the corresponding style rule (e.g., color, alignment, font size, font, etc.), changing an attribute (e.g., target address of a hyperlink, source address of an image file, CSS selectors, etc.), changing the text (e.g., replacing, inserting, or appending existing text), changing the HTML markup corresponding to the content element (e.g., replacing, inserting, or appending the corresponding HTML markup, JavaScript, or CSS, etc.), and reordering (e.g., location or placement of the node in the object model), among others. The change list can include content element identifiers and changes specified for each of the content element corresponding to the content element identifiers.

The computing device can add a modification indicator to the current content element (step 540). For example, the computing device can insert, append, or otherwise tag the content element modified using the change list with a modification indicator. The modification indicator can include a treatment specifier and a content element identifier. The treatment specifier may indicate whether the content element has been changed using the change list or the condition of the information resource or the respective content element.

The computing device can add a content element identified to the modification sequence (step 545). For example, the computing device can insert, enqueuer, or stack a content element identifier to the modification sequence list corresponding to the content element modified using the change list of the content modification script. The modification sequence list may specify an order or sequence in which to revert the properties of the content elements to the original or initial value.

The computing device can determine whether there are more content elements on the information resource (step 550). If there are more content elements on the information resource, the computing device can identify the next content element (step 555). For example, subsequent to determining that the current content element has a corresponding modification indicator or is modified using the change list, the computing device can continue iterating through the content elements of the information resource. The computing device can then repeat ACTs 530-550 any number of times.

If the information resource corresponds to a deactivation condition, the computing device can identify content element identifiers in the modification sequence (step 560). For example, the computing device can retrieve the content element identifiers listed in the modification sequence for reverting the properties of the content elements to the initial or default values. The order or sequence of retrieval of the content element identifiers may be first-in-first-out (FIFO), first-in-last-out (FILO), last-in-first-out (LIFO), or last-in-last-out (LILO), among others.

The computing device can identify the content element corresponding to the current content element identifier in the modification sequence (step 565). For example, the computing device can iterate through the modification sequence in the specified order or sequence to retrieve the content item identifier. The computing device can then identify the corresponding content element by matching the content item identifier to the content element.

The computing device can reset the property of the current content element to the original value (step 570). For example, for the current content element identified from the modification sequent, the computing device can reset or revert the value of the property of the current content element to the initial or default value. The initial or default value may be identified from the executable script for the information resource for the current content element.

The computing device can remove the modification indicator from the corresponding content element (step 575). For example, for the current content element reset to the initial or default value, the computing device can remove or delete the modification indicator corresponding to the content element. The computing device can also change the treatment specifier in the modification indicator to deactivated, allowing subsequent changes using the change list.

The computing device can determine whether there are more content element identifiers in the modification sequence (step 580). For example, the computing device can dequeue, unstack, or remove the previous content element identifier from the modification sequence. The computing device can then identify the next content element identifier to revert the properties of the corresponding content element to the initial or default values. If there are more content element identifiers in the modification sequence, the computing device can identify the next content element identifier (step 585) and repeat steps 565-570. In method 500, steps 510-585 may be repeated any number of times.

FIG. 6 shows the general architecture of an illustrative computer system 600 that may be employed to implement any of the computer systems discussed herein (including the system 210 and its components such as the content request module 230, the content selection module 235, and script provider module 240 or the application 310 and its modules, the resource parser 314, the content renderer 316, and content modification script 318 and its components) in accordance with some implementations. The computer system 600 can be used to provide information via the network 205 for display. The computer system 600 of FIG. 6 comprises one or more processors 620 communicatively coupled to memory 625, one or more communications interfaces 605, and one or more output devices 610 (e.g., one or more display units) and one or more input devices 615. The processors 620 can be included in the data processing system 210 or the other components of the system 210 such as the content request module 230, the content selection module 235, and the script provider module 240. The processors can be included in the client device 225 or their modules, such as the application 310, the resource parser 314, the content renderer 316, content modification script 318, the event detector 320, the policy enforcer 322, the comparator 324, the counter 326, and the timer counter 328.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 210 of FIG. 1, the data processing system 210 can include the memory 625 to store information related to the availability of inventory of one or more content units, reservations of one or more content units, among others. The memory 625 can include the database 245. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 1, one or more communications interfaces facilitate information flow between the components of the system 600. In some implementations, the communications interface(s) may be configured (e.g., via various hardware components or software components) to provide a website as an access portal to at least some aspects of the computer system 600. Examples of communications interfaces 605 include user interfaces (e.g., web pages), through which the user can communicate with the data processing system 600.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 230, the content selection module 235, and the script provider module 240 can include or share one or more data processing apparatuses, computing devices, or processors. The application 310, the resource parser 314, the content renderer 316, the content modification script 318, the event detector 320, the policy enforcer 322, the comparator 324, the counter 326, and the timer 328 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 600 or system 210 can include clients and servers. For example, the data processing system 210 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 230, the content selection module 235, and the script provider module 240 can be part of the data processing system 210, a single module, a logic device having one or more processing modules, one or more servers, or part of a search engine. In addition, the application 310, the resource parser 314, the content renderer 316, the content modification script 318, the event detector 320, the policy enforcer 322, the comparator 324, the counter 326, and the timer 328 can include or can be part of the client device 225, a single module, or a logic device having one or more processing module.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to attributing a scroll event on an application, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for dynamically modifying properties of content elements within information resources by client-side computing devices, comprising:

receiving, by an application executed by a processor of a client device, an information resource including a content element and a content modification script, the content element including a property having a first value, the content modification script including a predefined trigger event and a change list for modifying the information resource, the change list including a second value for the property;

detecting, by an event detector executed by the processor, a first occurrence of the predefined trigger event on the information resource;

determining, by the event detector, responsive to detecting the first occurrence of the predefined trigger event, that the information resource satisfies an activation condition of the change list;

setting, by a policy enforcer executing by the processor, responsive to determining that the information resource satisfies the activation condition of the change list, the property of the content element to the second value; and adding, by the policy enforcer, responsive to setting the property of the content element to the second value, a modification indicator corresponding to the content element to prevent modification of the content element while the information resource satisfies the activation condition of the change list.

2. The method of claim 1, further comprising:

detecting, by the event detector, a second occurrence of the predefined trigger event on the information resource, the second occurrence subsequent to the first occurrence;

determining, by the event detector, responsive to detecting the second occurrence of the predefined trigger event of the information resource, that the information resource satisfies a deactivation condition of the change list; and resetting, by the policy enforcer, responsive to determining that the information resource satisfies the deactivation condition, the property of the content element to the first value.

3. The method of claim 2, further comprising:

determining, by the event detector, responsive to detecting the second occurrence of the predefined trigger event, that the information resource satisfies the activation condition of the change list, the activation condition including loading of a second information resource by the application, the second information resource including a second content element, the second content element including a second property having a third value; and setting, by the policy enforcer, responsive to detecting the second occurrence of the predefined trigger event and determining that the information resource satisfies the activation condition of the change list, the second property of the second content element to a fourth value of the change list different from the third value; and adding, by the policy enforcer, responsive to setting the second property of the second content element to the fourth value, a second modification indicator corresponding to the second content element to prevent modification of the second content element while the information resource satisfies the activation condition of the change list.

4. The method of claim 1, further comprising:

receiving, by the application, subsequent to detecting the first occurrence of the predefined trigger event, a second content element including a second property having a third value, the second content element inserted into the information resource;

detecting, by the event detector, a second occurrence of the predefined trigger event on the information resource, the second occurrence subsequent to the first occurrence;

determining, by the event detector, responsive to detecting the second occurrence of the predefined trigger event, that the information resource satisfies the activation condition of the change list;

determining, by the policy enforcer, responsive to determining that the information resource satisfies the activation condition of the change list, that the second element is inserted into the information resource subsequent to detecting the first occurrence of the predefined trigger event;

setting, by the policy enforcer, responsive to determining that the second element is inserted to the information resource, the second property of the second content element to a fourth value of the change list different from the third value;

adding, by the policy enforcer, to a modification sequence list, a second element identifier corresponding to the second content element subsequent to adding of a first element identifier corresponding to the content element;

detecting, by the event detector, a third occurrence of the predefined trigger event on the information resource, the second occurrence subsequent to the third occurrence of the predefined trigger event;

determining, by the event detector, responsive to detecting the second occurrence of the predefined trigger event, that the information resource satisfies a deactivation condition of the change list; and resetting, by the policy enforcer, responsive to determining that the information resource satisfies the deactivation condition, the property of the content element to the first value and the second property of the second content element to the third value based on the modification sequence list.

5. The method of claim 4, wherein resetting the property of the content element to the first value responsive to determining that the information resource satisfies the deactivation condition further comprises resetting the property of the content element to the first value subsequent to resetting the second property of the second content element to the third value in accordance to the modification sequence list.

6. The method of claim 1, further comprising:

generating, by the application, a first style rule corresponding to the content element based on the first value of the property of the content element; and wherein setting the property of the content element to the second value further comprises generating a second style rule corresponding to the content element based on the second value specified by the content modification script, the second style rule overriding the first style rule.

7. The method of claim 1, further comprising:

detecting, by the event detector, a second occurrence of the predefined trigger event on the information resource, the second occurrence subsequent to the first occurrence;

identifying, by the event detector, responsive to detecting the second occurrence of the predefined trigger event, an occurrence of an interaction event on the content element;

maintaining, by the policy enforcer, responsive to identifying the occurrence of the interaction event on the content element, the modification indicator on the content element to prevent the modification of the content element while the information resource satisfies the activation condition of the change list.

8. The method of claim 1, further comprising:
detecting, by the event detector, an occurrence of an interaction event on the content element, the interaction event changing the property of the content element to a third value different from the second value;
removing, by the policy enforcer, responsive to detecting the occurrence of the interaction event on the content element, the modification indicator from the content element to allow subsequent modification of the content element.

9. The method of claim 1, further comprising:
detecting, by the event detector, a second occurrence of the predefined trigger event on the information resource, the second occurrence subsequent to the first occurrence;
identifying, by the policy enforcer, responsive to detecting a second occurrence of the predefined trigger event, that the content element is modified from the modification indicator; and
maintaining, by the policy enforcer, responsive to identifying that the content element is modified, the second value of the property of the content element.

10. The method of claim 1, further comprising:
receiving, by the application, subsequent to receiving the information resource, a second content element for insertion into the information resource, the second content element including a second property having a third value;
detecting, by the event detector, a second occurrence of the predefined trigger event on the information resource, the second occurrence subsequent to the first occurrence, the predefined trigger event including receipt of additional content for the information resource;
determining, by the policy enforcer, responsive to detecting the second occurrence of the predefined trigger event, that the second content element is unmodified; and
setting, by the policy enforcer, responsive to determining that the second content element is unmodified, the second property of the second content element to a fourth value of the change list different from the third value.

11. A system for dynamically modifying properties of content elements within information resources by client-side computing devices, comprising:
an application executed by a processor of a client device configured to receive an information resource including a content element and a content modification script, the content element including a property having a first value, the content modification script including a predefined trigger event and a change list for modifying the information resource, the change list including a second value for the property;
an event detector executed by the processor configured to:
detect a first occurrence of the predefined trigger event on the information resource; and
determine, responsive to detecting the first occurrence of the predefined trigger event, that the information resource satisfies an activation condition of the change list; and a policy enforcer executed by the processor configured to:
set, responsive to determining that the information resource satisfies the activation condition of the change list, the property of the content element to the second value; and
add, responsive to setting the property of the content element to the second value, a modification indicator corresponding to the content element to prevent modification of the content element while the information resource satisfies the activation condition of the change list.

12. The system of claim 11, wherein the event detector is further configured to:
detect a second occurrence of the predefined trigger event on the information resource, the second occurrence subsequent to the first occurrence; and
determine, responsive to detecting the second occurrence of the predefined trigger event of the information resource, that the information resource satisfies a deactivation condition of the change list; and
wherein the policy enforcer is further configured to reset, responsive to determining that the information resource satisfies the deactivation condition, the property of the content element to the first value.

13. The system of claim 12, wherein the event detector is further configured to:
determine, responsive to detecting the second occurrence of the predefined trigger event, that the information resource satisfies the activation condition of the change list, the activation condition including loading of a second information resource by the application, the second information resource including a second content element, the second content element including a second property having a third value; and
wherein the policy enforcer is further configured to:
set, responsive to detecting the second occurrence of the predefined trigger event and determining that the information resource satisfies the activation condition of the change list, the second property of the second content element to a fourth value of the change list different from the third value; and
add, responsive to setting the second property of the second content element to the fourth value, a second modification indicator corresponding to the second content element to prevent modification of the second content element while the information resource satisfies the activation condition of the change list.

14. The system of claim 11, wherein the application is further configured to receive, subsequent to detecting the first occurrence of the predefined trigger event, a second content element including a second property having a third value, the second content element inserted into the information resource;
wherein the event detector is further configured to:
detect a second occurrence of the predefined trigger event on the information resource, the second occurrence subsequent to the first occurrence; and
determine, responsive to detecting the second occurrence of the predefined trigger event, that the information resource satisfies the activation condition of the change list; and
wherein the policy enforcer is further configured to:
determine, responsive to determining that the information resource satisfies the activation condition of the change list, that the second element is inserted into the information resource subsequent to detecting the first occurrence of the predefined trigger event; and set, responsive to determining that the second element is inserted to the information resource, the second property of the second content element to a fourth value of the change list different from the third value; and add, to a modification sequence list, a second element identifier corresponding to the second content element subsequent to adding of a first element identifier corresponding to the content element; and wherein the event detector is further configured to:
detect a third occurrence of the predefined trigger event on the information resource, the second occurrence subsequent to the third occurrence of the predefined trigger event; and determine responsive to detecting the second occurrence of the predefined trigger event, that the information resource satisfies a deactivation condition of the change list; and wherein the policy enforcer is further configured to reset, responsive to determining that the information resource satisfies the deactivation condition, the property of the content element to the first value and the second property of the second content element to the third value based on the modification sequence list.

15. The system of claim 14, wherein the policy enforcer is further configured to reset the property of the content element to the first value subsequent to resetting the second property of the second content element to the third value in accordance to the modification sequence list.

16. The system of claim 11, wherein the application is further configured to generate a first style rule corresponding to the content element based on the first value of the property of the content element; and wherein the policy enforcer is further configured to generate a second style rule corresponding to the content element based on the second value specified by the content modification script, the second style rule overriding the first style rule.

17. The system of claim 11, wherein the event detector is further configured to:
detect a second occurrence of the predefined trigger event on the information resource, the second occurrence subsequent to the first occurrence; and
identify, responsive to detecting the second occurrence of the predefined trigger event, an occurrence of an interaction event on the content element; and
wherein the policy enforcer is further configured to maintain, responsive to identifying the occurrence of the interaction event on the content element, the modification indicator on the content element to prevent the modification of the content element while the information resource satisfies the activation condition of the change list.

18. The system of claim 11, wherein the event detector is further configured to detect an occurrence of an interaction event on the content element, the interaction event changing the property of the content element to a third value different from the second value; and wherein the policy enforcer is further configured to remove, responsive to detecting the occurrence of the interaction event on the content element, the modification indicator from the content element to allow subsequent modification of the content element.

19. The system of claim 11, wherein the event detector is further configured to detect a second occurrence of the predefined trigger event on the information resource, the second occurrence subsequent to the first occurrence; and wherein the policy enforcer is further configured to:
identify, responsive to detecting the second occurrence of the predefined trigger event, that the content element is modified from the modification indicator; and maintain, responsive to identifying that the content element is modified, the second value of the property of the content element.

20. The system of claim 11, wherein the application is further configured to receive subsequent to receiving the information resource, a second content element for insertion into the information resource, the second content element including a second property having a third value;

wherein the event detector is further configured to detect a second occurrence of the predefined trigger event on the information resource, the second occurrence subsequent to the first occurrence, the predefined trigger event including receipt of additional content for the information resource;

wherein the policy enforcer is further configured to:
determine, responsive to detecting the second occurrence of the predefined trigger event, that the second content element is unmodified; and set, responsive to determining that the second content element is unmodified, the second property of the second content element to a fourth value of the change list different from the third value.

* * * * *